US012730904B1

(12) United States Patent
Sawant et al.

(10) Patent No.: US 12,730,904 B1
(45) Date of Patent: Sep. 8, 2026

(54) VULNERABILITY ANALYSIS USING PRE-COMPUTED COMPONENT REACHABILITY INFORMATION FOR SOFTWARE COMPONENTS

(71) Applicant: Endor Labs Inc, Palo Alto, CA (US)

(72) Inventors: Anand Ashok Sawant, Davis, CA (US); Georgios Gousios, Delft (NL); Varun Badhwar, Palo Alto, CA (US)

(73) Assignee: Endor Labs Inc, Palo Alto, CA (US)

( * ) Notice: Subject to any disclaimer, the term of this patent is extended or adjusted under 35 U.S.C. 154(b) by 0 days.

(21) Appl. No.: 19/447,552

(22) Filed: Jan. 13, 2026

Related U.S. Application Data

(60) Provisional application No. 63/943,448, filed on Dec. 17, 2025.

(51) Int. Cl.

| | |
|---|---|
| ***G06F 21/00*** | (2013.01) |
| ***G06F 8/41*** | (2018.01) |
| ***G06F 21/55*** | (2013.01) |
| ***G06F 21/57*** | (2013.01) |

(52) U.S. Cl.
CPC ............ *G06F 21/577* (2013.01); *G06F 8/433* (2013.01); *G06F 21/552* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 8,495,748 | B2 * | 7/2013 | Das | G06F 21/577 726/1 |
| 10,713,364 | B2 * | 7/2020 | Abadi | G06F 16/9024 |
| 10,803,061 | B2 * | 10/2020 | Foo | G06F 16/2264 |
| 11,017,094 | B2 * | 5/2021 | Wei | G06F 11/3612 |
| 12,287,885 | B1 * | 4/2025 | Matrosov | G06F 21/577 |
| 12,659,345 | B1 | 6/2026 | Aboukhadijeh et al. | |
| 12,664,289 | B1 | 6/2026 | Aboukhadijeh et al. | |
| 2021/0271762 | A1 * | 9/2021 | McCourt et al. | G06F 21/54 |
| 2023/0185568 | A1 * | 6/2023 | Wu | G06F 8/433 717/123 |
| 2024/0095360 | A1 * | 3/2024 | Wu | G06F 8/75 |
| 2026/0141062 | A1 | 5/2026 | Aboukhadijeh et al. | |

* cited by examiner

*Primary Examiner* — Maung T Lwin
(74) *Attorney, Agent, or Firm* — FP; Sikander M. Khan

(57) ABSTRACT

Techniques are disclosed for performing vulnerability analysis based on pre-computed reachability information of software components. A system may determine reachable software components that are reachable by use of the first software component in a software project, the reachable software components including the first software component, a second software component that is a dependency of the first software component, and a third software component that is a dependent software component of the second software component and that is reachable by the second software component by the use of the first software component in the software project. The system may compute a pre-computed reachable component dataset comprising the reachable software components of the first software component, obtain a project dependency listing that identifies software components used by a particular software project and generate a vulnerability report for the software project based at least in part on the pre-computed reachable component dataset.

20 Claims, 21 Drawing Sheets

Table 710

| ROW | Component Identifier 720 | Version Identifier 722 | Dataset REF 724 | |
|---|---|---|---|---|
| 712 | L1 | ... | P1 | |
| 714 | L1 | vX.Y.Z | P2 | |

Table 810

| Record | Function Identifier 820 | VULN ID 822 | SEV 824 | META 826 |
| --- | --- | --- | --- | --- |
| 812 | openSocketImpl() | ... | Moderate | M1 |
| 814 | configureSecureChannel() | ID2<br>ID3 | High<br>Extreme | M2<br>M3 |

Figure 9:
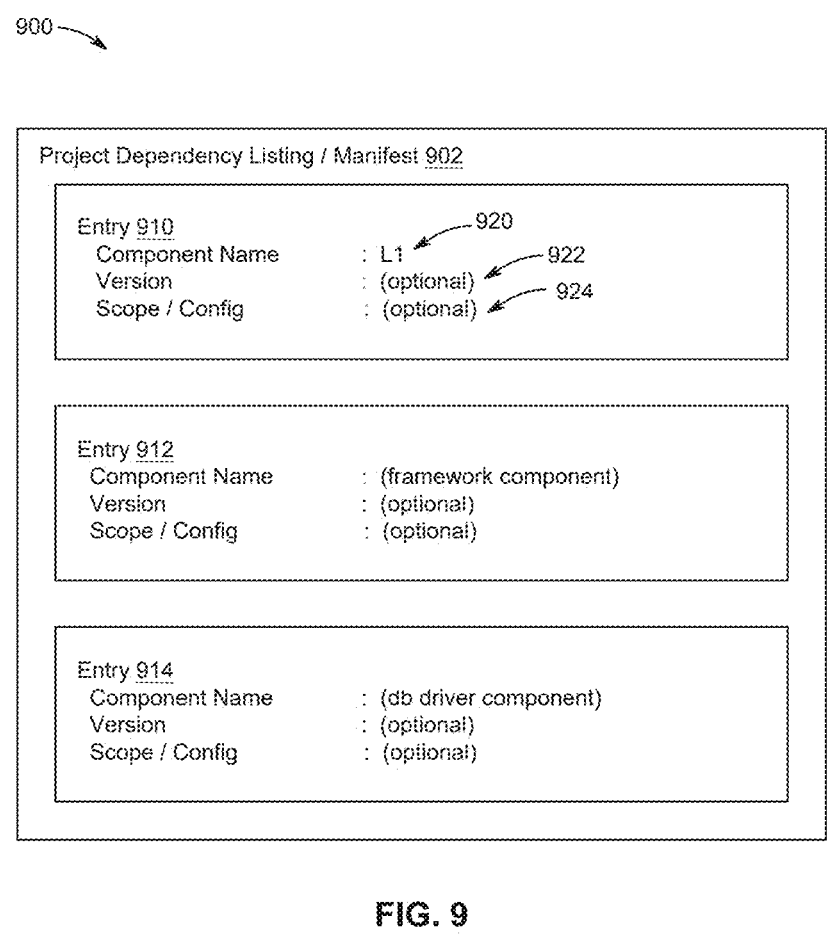

900

Project Dependency Listing / Manifest 902

Entry 910
Component Name : L1 920
Version : (optional) 922
Scope / Config : (optional) 924

Entry 912
Component Name : (framework component)
Version : (optional)
Scope / Config : (optional)

Entry 914
Component Name : (db driver component)
Version : (optional)
Scope / Config : (optional)

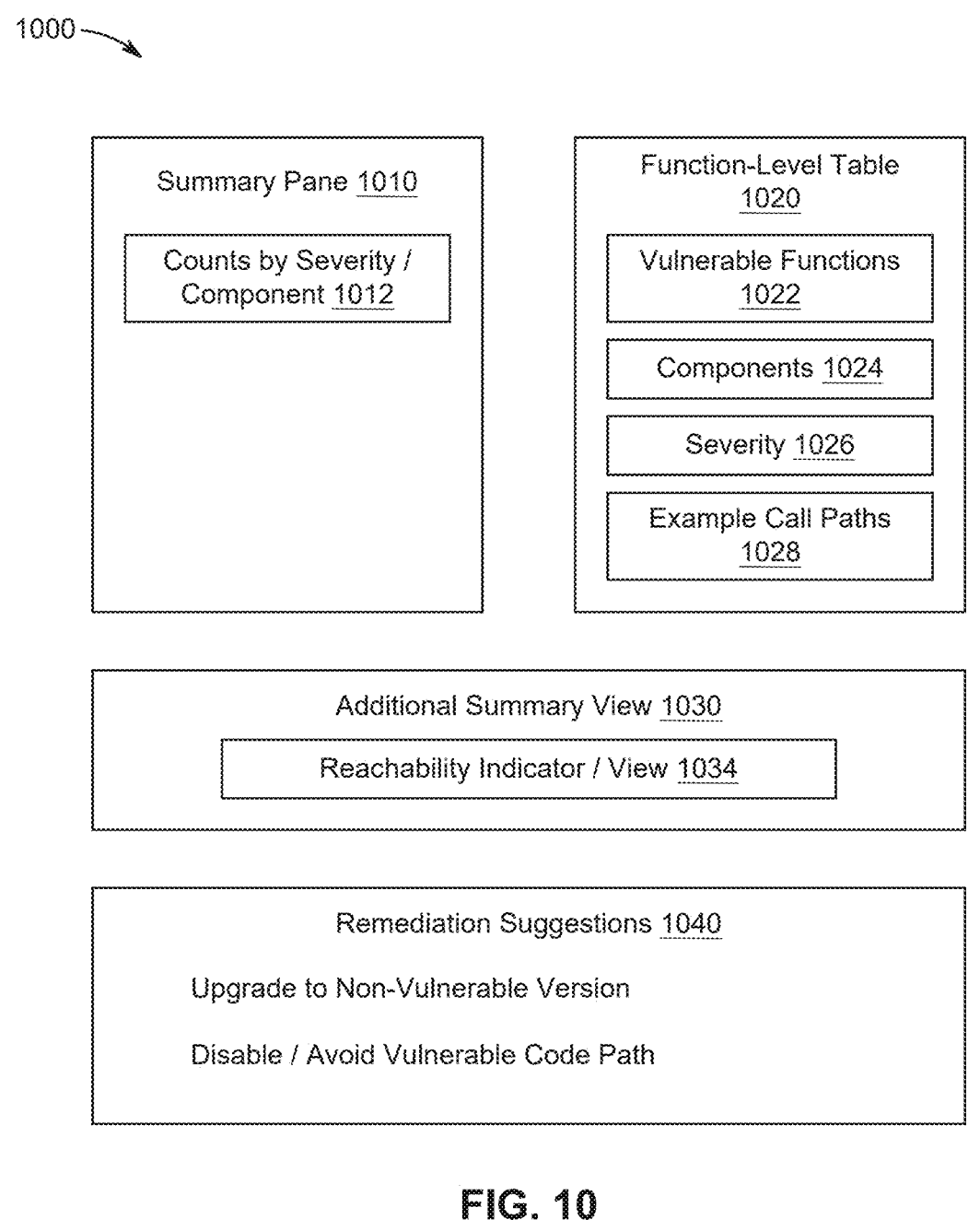

Summary Pane 1010

Counts by Severity / Component 1012

Function-Level Table 1020

Vulnerable Functions 1022

Components 1024

Severity 1026

Example Call Paths 1028

Additional Summary View 1030

Reachability Indicator / View 1034

Remediation Suggestions 1040

Upgrade to Non-Vulnerable Version

Disable / Avoid Vulnerable Code Path

FIG. 10

VULNERABILITY ANALYSIS USING PRE-COMPUTED COMPONENT REACHABILITY INFORMATION FOR SOFTWARE COMPONENTS

PRIORITY SECTION

This document is a United States Non-provisional utility patent application under statute 35 U.S.C. 111(A). This document claims priority and benefit to a U.S. Provisional utility patent application that is identified by a Serial No: 63/943,448 and that is titled "VULNERABILITY ANALYSIS USING PRE-COMPUTED COMPONENT REACHABILITY INFORMATION FOR SOFTWARE COMPONENTS", and that was filed with the U.S. Patent and Trademark Office (USPTO) on Dec. 17, 2025. The above-referenced document is herein incorporated by reference in its entirety.

BACKGROUND

Technological Field

Modern software projects frequently rely on large collections of interdependent software components, including libraries, frameworks, and transitive dependencies that may span multiple ecosystems and versions. Security information about these components, such as vulnerability advisories or standardized vulnerability records, is often published at varying levels of granularity and may change over time. Determining which portions of this information are actually relevant to a particular project can be challenging, especially when accurate assessment may consider whether dependent software components are included for a particular configuration and/or whether vulnerable functions are reachable along function-level call paths across multiple layers of dependencies. In many environments, projects may be difficult or impractical to build for analysis, dependency graphs may include opaque or private components, and different versions of the same component may expose different behaviors. As a result, organizations may experience inefficiencies, uncertainty, and noise when attempting to determine which vulnerabilities in a complex dependency graph correspond to functions that are realistically reachable from a project's dependencies and therefore warrant prioritization or remediation.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 9 illustrates a block diagram of an example manifest or project dependency listing for a software project, in accordance with example embodiments of the disclosure.

FIG. 10 illustrates a block diagram of an example vulnerability report generated based at least in part on pre-computed reachability datasets and vulnerability data, in accordance with example embodiments of the disclosure.

DETAILED DESCRIPTION

Figure 1:
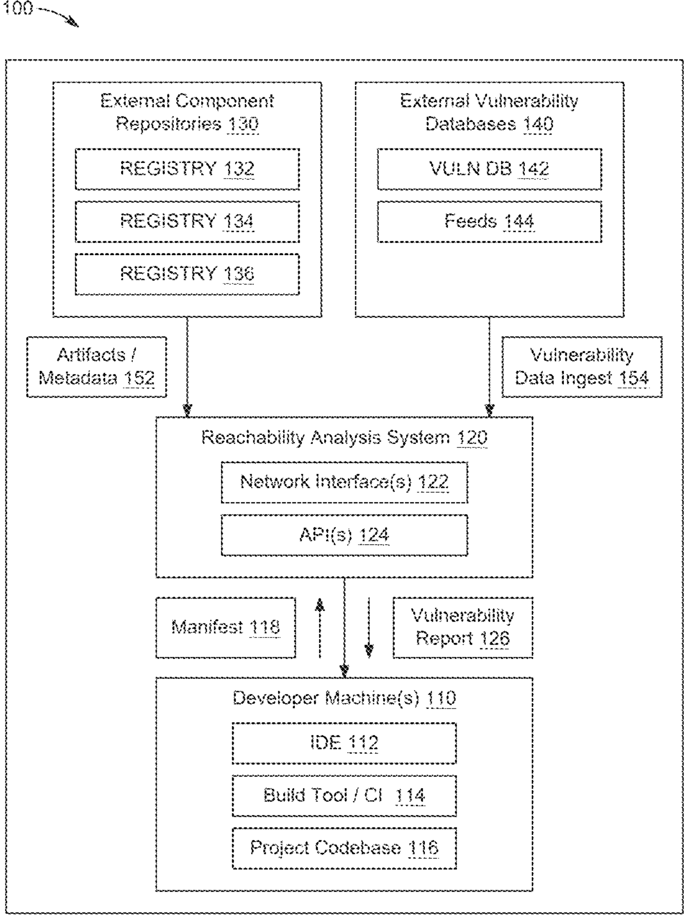
FIG. 1 illustrates a schematic diagram of an example environment including developer machines, a reachability analysis system, systems or repositories for libraries or other software components, an external vulnerability database, and network or communication paths between them, in accordance with example embodiments of the disclosure.

The following detailed description is directed to example embodiments and is not intended to limit the scope of the claims. A person of ordinary skill in the art will recognize that many variations are possible without departing from the spirit and scope of the disclosed subject matter.

Example embodiments of this disclosure include methods, apparatuses, computer-readable media, and system(s) for performing reachability analysis of software components and generating vulnerability reports based at least in part on pre-computed reachability datasets. In some examples, a first software component is analyzed to determine, for the first software component, a plurality of software components that are reachable by use of the first software component in a software project as reachable software components. In some examples, the identified reachable software components are stored in association with the first software component as a pre-computed reachable component dataset that can be reused across multiple projects. In some implementations, function-level call-path tracing may be used as a refinement to determine reachability at a finer granularity within the reachable software components.

In some examples, a project dependency listing that identifies a plurality of software components used by a software project is obtained, and the pre-computed reachable component dataset for at least the first software component is used to generate a vulnerability report for the software project. The vulnerability report may identify vulnerabilities of the reachable software components of the first software component, thereby enabling more efficient and accurate assessment of security risks across complex dependency graphs without requiring full call-path tracing for each project.

In many implementations, the disclosed technology may improve vulnerability analysis workflows by eliminating the need to compile or build the subject project codebase in order to determine reachability of vulnerable software components. Instead of deriving reachability from an application-specific call graph for each project, the system may leverage pre-computed reachable component datasets that are generated at the level of individual software components (e.g., libraries, frameworks). In some implementations, such precomputation may additionally be carried out on a per-version basis for those components.

For example, for a given component, the system may determine reachable software components, compute a pre-computed reachable component dataset that may capture which software components are reachable from that component's entry points and dependency structure, and may store that dataset in association with the component, and in some examples, its version. In implementations that provide additional granularity, the system may also compute and store reachability information at the level of functions and/or call paths as a refinement of the component-level dataset.

For a given software project, the system may obtain a project dependency listing that identifies the components used by the project, resolve those components according to build-tool semantics (for example, as implemented by package managers or build systems), and then retrieve corresponding pre-computed reachable component datasets for those components. Vulnerability information from a vulnerability database may be combined with the retrieved reachable component datasets to determine reachable vulnerable datasets that indicate, for the components identified in the dependency listing, which reachable software components have associated vulnerabilities. Additionally or alternatively, in implementations that maintain function-level reachability information, vulnerability information may be combined with function-level reachability to determine reminders or subsets of vulnerable functions within the reachable software components. The vulnerability information may be combined during a precomputation stage, during project-level analysis as in the example above, or in a hybrid manner. For example, a combined reachable-and-vulnerability dataset based on the vulnerability information and the pre-computed reachable component datasets may be pre-computed and stored as pre-computed reachable vulnerable datasets. In some examples, when vulnerability information for a software component is updated, the pre-computed reachable vulnerable datasets may be updated or regenerated based on the new vulnerability information and the pre-computed reachable component datasets. Additionally or alternatively, the pre-computed reachable vulnerable datasets may include a vulnerability information version which may be checked to see if the vulnerability information has been updated for a component since the last generation of the pre-computed reachable vulnerable datasets. In such examples, the project-level analysis may not obtain the pre-computed reachable component dataset for a component unless the pre-computed reachable vulnerable dataset is determined to be out of date.

In the examples above and primarily discussed throughout this disclosure, the pre-computed reachable component dataset for a particular component may identify reachable software components across multiple transitive layers (e.g., including second-level and further-level dependent software components that are reachable by use of the first component in a project). In addition or alternatively, the pre-computed reachable component dataset for a particular component may include only second-level reachable software components (e.g., directly dependent software components). In such an example, the per-component portions of reachable component information for second-level and further-level software components may be obtained (e.g., during project-level analysis) and rapidly merged to compute reachability across additional levels for the first-level software component.

These and other variations are contemplated and within the scope of this disclosure and, while the discussion herein focuses on certain variations primarily, such focus does not disclaim or suggest that these variations and others, or use thereof, are not within the scope of this disclosure.

Whether pre-computed or computed during the project-level analysis, the reachable vulnerable datasets for the software components identified by the project dependency listing may be used to generate a vulnerability report that indicates reachable software components that are vulnerable, and in some implementations may further indicate vulnerable functions within those reachable software components. Depending on the implementation and as discussed in more detail with regard to the figures, the detail level and/or choice of information included in the vulnerability report may vary.

Because reachability determination may already have been performed and stored per component, the per-project workflow may be reduced to dependency resolution, reachable dataset retrieval, and combination with vulnerability information, with no requirement to compile the project source, generate bytecode for the project, or construct an application-level call graph.

This build-free operation may yield concrete time and compute savings. Many real-world projects are large monorepos or have complex build configurations that are expensive to compile and may fail to build in a scanning environment. A scanning environment may be a computing environment in which a security scanning tool runs to analyze a project. Some security analysis workflows pay the cost of repeated builds and application-level analysis for each scan, or fall back to manifest-only reporting when builds fail. By contrast, the disclosed system may amortize analysis cost over an ecosystem of reusable components: once a component has been analyzed and its pre-computed reachable component dataset has been stored, subsequent scans of any number of projects that depend on that component may reuse the stored dataset without re-running the analysis. This may reduce CPU, memory, and wall-clock time required for each scan, and may enable reachability-aware reporting even for projects that cannot be successfully compiled in the scanning environment.

The disclosed technology may also improve the precision and granularity of vulnerability reporting by operating on reachability of software components, rather than treating the full transitive dependency tree as automatically in-scope. During precomputation, the system may determine which dependent software components are actually reachable by use of a first-level software component, including across multiple transitive layers, and may store that reachability in the pre-computed reachable component dataset for the first-level software component. In some examples, the first-level software components may be software components listed in a project dependency listing (e.g., a project manifest) and may be considered direct dependencies of the software project. In implementations that provide additional granularity, the system may also perform call-path tracing from specific entry points of a first-level software component into second-level and further-level components to determine which functions are reachable along those paths. As mentioned above, vulnerability data from a vulnerability database may be combined with component-level reachability (and, where available, intersected with function-level reachability) during precomputation, at project scan time when the dependency listing is known, or in a combination of both.

Because reachability may be grounded in how software components are actually used and included, vulnerability reports generated using these datasets may distinguish between vulnerabilities associated with reachable software components and vulnerabilities associated with dependent software components that are not reachable for the relevant usage and configuration. For example, a software project may include a direct dependency that lists multiple transitive dependencies in metadata, while only a subset of those transitive dependencies are reachable for a given build configuration. The systems and techniques disclosed herein may utilize build parameters for the software project (e.g., if included in the project dependency listing) or, if known, for the project's dependencies, to distinguish dependent software components which, while present in metadata, may not be included at build time for the project. In implementations that also use function-level information as a refinement, the system may further distinguish vulnerabilities that are reachable through invoked functions from vulnerabilities that reside in the same reachable component but are not reachable via any call path for the relevant configuration. Additionally or alternatively, in some implementations, the system may classify and/or organize vulnerabilities into categories such as "reachable," "unreachable," or "potentially reachable," based on the presence or absence of reachability relationships in the stored datasets and the project's dependency listing.

Modern software projects are assembled from large graphs of interdependent software components, including libraries and frameworks that themselves depend on further transitive components. Security analysis systems according to this disclosure may determine not only whether a vulnerable component appears in a project's dependency tree, but also whether particular dependent software components are reachable from the project's direct dependencies along reachability relationships across multiple transitive layers, and in some implementations may further refine that determination using function-level call paths.

Some tooling attempts to address aspects of this problem using one or more approaches. In one approach, the system compiles or otherwise builds the entire project, performs analysis over the combined application and dependency code, and then attempts to identify vulnerabilities reachable from user entry points. These build-dependent workflows are computationally expensive and often fail outright on large or misconfigured projects, preventing reachability analysis from being performed. In another approach, tools rely primarily on static manifests and naïve component dependency. Manifest-only approaches may report every vulnerability associated with every component that appears anywhere in the transitive dependency tree of the project, without distinguishing whether the dependent component is reachable for the project's configuration or whether the dependent component could be included in a build of the software project. Both approaches may suffer from scalability and reporting limitations: build-dependent systems may fail to reliably handle large or unbuildable projects, and manifest-only approaches may over-report and may not provide actionable prioritization.

Furthermore, when version-sensitive function-level reachability information is not maintained in a reusable form across projects, inaccuracies may result. Different versions or variants of the same software component (e.g., library) may include different dependencies, expose different entry points, or exclude certain dependent software components under different build configurations. When a system fails to precompute reachability on a per-version basis, it may report vulnerabilities associated with software components that are not reachable or which may not be applicable to the version in the configuration identified in the project dependency listing. The presence of private or internal dependencies may exacerbate these problems, because detailed call graphs for such components may be unavailable to an external analysis service. As a result, many conventional systems may either miss relevant reachability relationships in transitive components or, conversely, attribute all vulnerabilities in deep transitive layers to the top-level project without considering reachability.

In short, there may be a need for a computer-implemented vulnerability analysis technique that (i) decouples reachability analysis across transitive dependencies from per-project builds, (ii) operates in a way that can respect differences in component behavior (and, in some implementations, differences between versions), (iii) accounts for multiple levels of transitive dependencies, and (iv) can be invoked efficiently at scan time without reliance on buildable or parsable project source code (e.g., based on a project's dependency listing and pre-computed reachability information). In some implementations, function-level call-path tracing may be used as a refinement where additional granularity is desired.

The disclosed technology may address these problems by precomputing and storing component-scoped reachability datasets that encode transitive reachability relationships among software components. The pre-computed reachable component datasets may then be used or reused in combination with vulnerability information from one or more vulnerability data sources to determine reachable vulnerable datasets (e.g., pre-computed or computed during project-level analysis) and ultimately to generate vulnerability reports for individual software projects.

In one aspect, a computer-implemented method may receive a first software component, such as a library, for reachability analysis. The system may determine, for the first software component, reachable software components including at least a second software component that is a dependency of the first software component and a third software component that is a dependent software component of the second software component and is reachable by the second software component by use of the first software component in a software project. The system may then compute and store, in association with the first software component, a pre-computed reachable component dataset comprising the reachable software components, optionally on a per-version basis.

Vulnerability information associated with reachable software components in the pre-computed reachable component dataset may be determined using a vulnerability database that stores vulnerability records for software components and/or functions. In some implementations, the system may, during precomputation, consult the vulnerability database to associate reachable software components with vulnerability details, thereby generating enriched datasets that directly encode reachable and vulnerable software components. In other implementations, the system may maintain the reachable component dataset as a reachability-only structure and, at project scan time, may correlate the reachable component dataset with the vulnerability database based on identifiers for components identified in the project dependency listing. Hybrid approaches are also possible; for example, the system may store both baseline component reachability datasets and derived vulnerability-enriched views for selected components.

In some implementations, the determining of reachable software components may be performed using static analysis of source code, bytecode, or binary artifacts, and in some implementations may include function-level call-path tracing as a refinement to support more detailed reporting or filtering. When call paths within private dependencies are unavailable, the system may flatten direct dependencies of those private dependencies and treat entry points of those direct dependencies as additional entry points for reachability computation, thereby preserving coverage in the presence of private or internal packages. A private dependency may be a software component (e.g., a library or package) that a project or another software component depends on but that is not publicly available in an open registry or repository (e.g., because it is hosted in an organization's internal artifact repository and access is restricted). As a result, an external analysis system may not be able to fetch the dependency's source code or build artifacts (or its full metadata) to fully analyze its internal call paths. An internal dependency is a software component maintained within the same organization (or within the same overall codebase/monorepo) and used by other internal projects, often distributed through internal build systems or artifact repositories. Unlike public dependencies, its availability and versioning are typically governed by internal processes, and access may be limited to authorized teams or environments.

The precomputation may be performed for a plurality of different software components (e.g., each acting as a "first" component during its own analysis) and the system may store respective pre-computed reachable component datasets for those components prior to any particular project scan. As a result, when a project later references any of these components, the system may consult the pre-computed datasets rather than performing expensive analysis from scratch.

At scan time for a given software project, the system may receive a project dependency listing identifying a plurality of software components used by the project, including one or more components for which precomputed reachable component datasets exist. The system may retrieve the pre-computed reachable component dataset stored in association with at least a first software component identified in the listing and may combine the retrieved reachability information with vulnerability data from the vulnerability database. Using this combination, the system may generate a vulnerability report for the software project that identifies vulnerabilities associated with reachable software components of the first software component and may omit vulnerabilities associated with dependent software components that are not reachable given the dependency listing and applicable configuration.

The techniques may be implemented in a system comprising at least one processor and a non-transitory computer-readable medium storing instructions. The instructions may cause the system to execute the precomputation workflows (determining reachable software components, dataset storage, and vulnerability information association), as well as the per-project workflows (receiving dependency listings, selecting appropriate precomputed datasets, combining them with vulnerability information, and generating reports). In some implementations, the system may expose an application programming interface (API) that accepts a project dependency listing and returns a vulnerability report that incorporates one or more of the precomputed reachable component datasets and associated vulnerability information, allowing external tools to invoke the analysis without replicating the underlying analysis logic.

The disclosed technology may provide concrete technical improvements to computer-implemented vulnerability analysis systems, rather than merely reorganizing abstract security information.

Because reachability across dependent software components may be precomputed per component, the system may respond to project-level scans using a lightweight dependency listing as input, without compiling or building the project code and without recomputing application-level call graphs for each scan. This may reduce memory consumption and processing time at scan time, enabling large or complex projects (e.g., projects that may be difficult or impossible to build in a given environment) to obtain reachability-aware vulnerability reports.

By associating vulnerability information with reachable software components (and, in some implementations, refining results using function-level reachability), the system may reduce false positives compared to manifest-only approaches that treat all vulnerabilities in a transitive dependency tree as equally applicable. When the system also takes into account differences in component behavior (and, in some implementations, differences between versions or configurations), it may avoid misattributing vulnerabilities across different releases or variants of the same component, thereby improving the accuracy of the resulting vulnerability reports.

The use of pre-computed reachable component datasets and a vulnerability database may enable the system to amortize the cost of reachability determination across many projects and many scans. Once the pre-computed reachability information has been stored for a given component, subsequent project scans that depend on that component may reuse that information with minimal incremental computation, whether vulnerability data is combined during precomputation, at project scan time, or in a combination of both. This may produce a tangible performance improvement at the systems level, particularly in environments where many projects share common reusable dependencies.

Handling of private dependencies through flattening and alternative entry-point modeling may further reduce blind spots that might otherwise require user intervention or might force conservative, noisy reporting. The exposed API may allow other tooling to integrate these analyses into build pipelines or security dashboards without duplicating the underlying analysis engine. Collectively, these features may improve how conventional computing systems execute vulnerability analysis workflows by enabling more accurate, more scalable security computations using fewer resources and across a broader class of codebases than may be practical with build-dependent or manifest-only approaches.

In the following non-limiting examples, various implementations of the systems and techniques described herein are discussed to illustrate how pre-computed reachability datasets, vulnerability information, and project dependency listings may be combined in different environments and workflows. These examples are provided for illustrative purposes and are not intended to limit the scope of the disclosed technology.

In one example environment, a static analysis service may execute on a server system that includes one or more processors and a non-transitory computer-readable medium storing instructions. The service may be configured to perform reachability analysis for a plurality of software components and to generate vulnerability reports for software projects that depend on those components.

In a particular example, a first software component may correspond to a logging library that is packaged as an archive file and published in a component repository. The system may obtain the logging library for reachability analysis by downloading artifacts for a particular version. The system may perform call-path tracing from functions of the logging library to at least one function of a second software component that is a network-communication library, where the network-communication library is a transitive dependency of the logging library. The call-path tracing may be implemented using static analysis of bytecode artifacts extracted from the archive files, and may traverse method-invocation instructions to identify functions that are reachable via at least one call path originating in exported entry points of the logging library.

Based on the call-path tracing, the system may identify, as reachable functions of the first software component, functions within the logging library and within the network-communication library that are reachable via at least one call path originating in the logging library. The reachable functions of the logging library may include at least one function of the network-communication library that implements outbound socket connections. The system may compute, in association with the logging library, a pre-computed reachable dataset comprising identifiers of the reachable functions of the logging library, including functions resident in the network-communication library that are reachable from exported entry points of the logging library.

At a later time, a software project that implements a microservice may be built that uses the logging library as a dependency. A build tool or package manager may produce a project dependency listing that enumerates a plurality of software components used by the microservice project, including the logging library and its transitive dependencies (for example, the network-communication library and a data-serialization library). The static analysis service may obtain the project dependency listing, identify that the microservice project uses the logging library, and retrieve the corresponding pre-computed reachable dataset for that library (and version, if applicable).

The system may also access a vulnerability database that stores records of functions associated with known security vulnerabilities, for example functions that appear in standardized vulnerability records such as common vulnerabilities and exposures (CVE) records. Each record in the vulnerability database may specify a function identifier (such as a fully qualified method signature), a component and optional version identifier, and additional information such as a vulnerability identifier, severity, and remediation notes. The system may correlate the functions in the pre-computed reachable dataset for the logging library with entries in the vulnerability database to determine which reachable functions are associated with vulnerabilities.

The system may generate a vulnerability report for the microservice project based at least in part on the pre-computed reachable dataset of the logging library. The vulnerability report may identify, among the reachable functions of the logging library, one or more functions that are associated with vulnerabilities as vulnerable functions. For example, the report may indicate that a specific function of the network-communication library that opens a socket with unsafe defaults is reachable from the logging library when used by the microservice project, and may include the associated standardized vulnerability identifier and remediation guidance. Functions that are associated with vulnerabilities but are not reachable from the logging library according to the call-path tracing may be omitted from the report, thereby reducing false positives.

From a technical standpoint, this example may improve computer functionality by shifting expensive static analysis from per-project scans to pre-computed, per-component datasets. The system may perform static, inter-procedural call-path tracing once for each component (and, in some implementations, for each component/version), store the results in a reachability repository, and reuse those results across many projects. This may reduce build-time and pipeline latency for individual projects, may lower CPU and memory consumption on build or continuous-integration servers, and may enable more fine-grained, function-level vulnerability reporting compared to unfiltered manifest-only techniques that enumerate vulnerabilities for all components in a transitive dependency chain.

In another example implementation, the system may construct a graph of reachable calls that spans a network of interconnected software components, and may use the graph both to identify vulnerable functions and to exclude vulnerabilities that are not actually reachable.

In this example, a first software component may be an authentication library published in a public package registry. The authentication library may declare a dependency on a second software component that provides cryptographic functions, which in turn may depend on a private dependency maintained within an organization's internal artifact repository. The system may obtain the authentication library and, in some cases, the cryptographic component and at least metadata for the private dependency for reachability analysis.

The system may perform call-path tracing starting from exported entry points of the authentication library, such as login-related or token-verification functions. The call-path tracing may traverse into functions of the cryptographic component that implement hash computation and token signing. To build a global view, the system may build, based on the call-path tracing, a graph of reachable calls that spans a network of interconnected software components by tracing calls that propagate between the authentication library, the cryptographic component, and other dependencies. The system may add directly accessible calls of the authentication library (e.g., those that are accessible when invoking the authentication library from a software project) to the graph as roots, and may link, in the graph, transitively accessible calls in the cryptographic component and other components to the directly accessible calls. The transitively accessible calls may be calls that are directly or indirectly invoked by directly accessible calls of the authentication library.

For the private dependency, however, organizational policies may limit distribution of source code or bytecode artifacts outside of a private repository, and the static analysis service may not be able to perform full call-path tracing within the private dependency. In such cases, the system may use a private-dependency flattening technique. When call paths within the private dependency are unavailable, the system may flatten direct dependencies of the private dependency by treating entry points of those direct dependencies as additional entry points for call-path tracing. For example, if the private dependency depends on a big-number arithmetic component and a side-channel-mitigation component, the system may treat exported entry points of those components as additional starting points, and may continue call-path tracing into those components even though internal call graphs for the private dependency are unavailable.

The vulnerability database in this example may store function-level vulnerability records for functions in the authentication library, the cryptographic component, the private dependency, and downstream components such as the big-number arithmetic component and the side-channel-mitigation component. By basing the call-path tracing on the graph of reachable calls, and by flattening private dependencies where necessary, the system may identify which vulnerable functions in the network of interconnected components are actually reachable from the authentication library when used in a project. A resulting vulnerability report may exclude vulnerable functions of dependent software components that are not reachable via any call path originating in the authentication library and propagating through the network, and may highlight only those vulnerabilities that are on a realizable execution path.

This example may provide technical benefits by allowing accurate reachability analysis even in environments where internal or private dependencies are partially opaque, without resorting solely to unfiltered manifest-only enumeration of transitive dependencies. The graph-based analysis and private-dependency flattening may support precise pruning of unreachable vulnerabilities, which may reduce noise in vulnerability reports, conserve developer attention, and enable automated remediation pipelines to focus on high-impact vulnerabilities that are actually exploitable in deployed configurations.

In another example implementation, the system may operate as a centralized reachability analysis service that precomputes and maintains pre-computed reachable datasets for a large corpus of components (and, in some implementations, component versions), independent of any particular project.

The service may periodically obtain software components from one or more artifact repositories, such as repositories for different programming languages and platforms. For each component, and for each of a plurality of different versions of that component in some implementations, the service may obtain source code, bytecode, or binary artifacts, may identify exported entry points, and may perform static call-path tracing into the component and its dependencies. For each component (and version, where used), the service may compute a pre-computed reachable dataset comprising identifiers of functions that are reachable from the exported entry points via at least one call path. The service may store the pre-computed reachable datasets in a reachability repository in association with component identifiers and, where applicable, version identifiers.

In some deployments, the reachability repository may be implemented as a distributed key-value store or graph database that is optimized for read-heavy workloads. The repository may be replicated across multiple data centers and may be cached in memory for frequently requested components and versions. When a customer project later submits a project dependency listing, the analysis service may retrieve pre-computed reachable datasets for components (and versions) in the listing, rather than performing full static analysis for each project. This may enable the service to support many concurrent projects while maintaining low latency and predictable resource usage.

Precomputing distinct datasets for multiple versions of each component may allow the service to account for changes in function-level behavior across versions. For example, a vulnerability may affect only certain versions of a library but not later versions, or a function that was previously unreachable from exported entry points may become reachable after an API change. By recomputing and storing version-specific reachable datasets, the service may generate vulnerability reports that are accurate for the versions in use, reducing both false positives (flagging vulnerabilities in unused or unreachable functions) and false negatives (missing vulnerabilities newly introduced in reachable code paths).

From a technical perspective, this example implementation may restructure how static analysis is performed in large-scale environments. Rather than tying analysis tightly to individual builds, the system may amortize the cost of inter-procedural call-path tracing across many projects and over time, improving scalability and enabling function-level vulnerability analysis for very large ecosystems of components that might otherwise be impractical to rescan for every project.

In another example implementation, the system may compute and use component-level reachability summaries that represent which software components are reachable from a given component when the component is used in a project, where the summaries are derived from underlying function-level call-path tracing and/or from dependency metadata, build parameters, or configuration semantics.

In one example, a first software component may be a client library for invoking remote web APIs. When the client library is used in a software project, it may depend on a second software component that implements HTTP transport. The HTTP transport component in turn may depend on a third software component that provides cryptographic primitives for secure transport handshakes. The system may obtain the client library and may determine, for that library, a plurality of software components that are reachable by use of the client library in a software project as reachable software components of the client library. The reachable software components in this example may include the client library itself, the HTTP transport component as a direct dependency, and the secure-transport component as a transitive dependency that is reachable from the HTTP transport component when the client library is used in the software project.

The system may compute, in association with the client library, a derived reachable-component summary comprising identifiers of software components for which functions appear in the pre-computed reachable-function dataset of the client library. For instance, the summary for a particular client-library version may list that library, the HTTP transport component, the secure-transport component, and several other transitive dependencies that contribute functions on reachable call paths. A project dependency listing for a particular project may identify a set of software components used by the project, including that client-library version. When generating a vulnerability report for the project, the system may use the pre-computed reachable-function dataset and, optionally, the derived component-level summary to assist in organizing or filtering vulnerability information.

A vulnerability database in this example may store function-level vulnerability entries and, in some implementations, additional component-level vulnerability entries. The system may identify vulnerabilities associated with functions that appear in the reachable-function dataset for the client library, and may also determine which components associated with those functions are present in the project's dependency listing. This may allow the system to emphasize vulnerabilities of components that contribute reachable functions while effectively de-emphasizing vulnerabilities associated with components that do not appear on any function-level call path originating in the client library for the project configuration.

In some implementations, the component-level summary may be implemented based at least in part on function-level call-path tracing. The system may compute function-level reachable datasets for each component and then aggregate which components appear in those call paths as reachable components. In other implementations, the component-level summary may be determined without function-level call-path tracing, such as by applying dependency-scope rules, build parameters, or configuration profiles associated with the component. This layering may allow the system to provide both function-level and component-oriented views of vulnerability data and may help exclude vulnerabilities that exist in transitive components but are not reachable via any function-level call path originating in the first software component.

This example may yield technical benefits by enabling scalable aggregation and filtering of vulnerability information based on reachability. Instead of merely checking whether a vulnerable component appears in a project's dependency tree, the system may determine whether the vulnerable component participates in an actual execution path from a particular component of interest. This may reduce unnecessary remediation work on components that are technically present but not reachable in a given configuration, and may improve the utility of vulnerability reports for automated patch selection and risk scoring, while optionally using function-level reachability information, when available, to further refine reporting.

In another example implementation, the reachability analysis and vulnerability-reporting capabilities may be exposed through an application programming interface (API) that can be invoked by build systems, continuous-integration pipelines, and integrated development environments (IDEs).

A reachability analysis service may operate as a network-accessible system that exposes an API endpoint. A client, such as a pipeline job or an IDE plug-in, may construct a project dependency listing for a particular project, including identifiers and, in some examples, versions of software components used by the project. The client may send a request to the API that includes the project dependency listing. The service may receive the request, may obtain or derive the project dependency listing, and may use pre-computed reachable datasets for one or more components in the listing to generate a vulnerability report for the project, as described in the examples above. The service may then return the vulnerability report in a structured format, such as a serialized data format, to the client.

The client may display the vulnerability report in a developer-facing UI or may use it to enforce policies in a build or continuous-integration pipeline, such as marking a build as failed when new reachable critical vulnerabilities are introduced. Because the service may use pre-computed reachable datasets and static call-path analysis, it may respond quickly enough to support interactive workflows (for example, updating vulnerability indicators in an IDE as a developer adds or removes dependencies).

This example implementation may demonstrate how the disclosed functionality can be integrated into automated, programmatic workflows. The API-based integration may enable a broad range of tools and environments to leverage reachability analysis, including component-level reachability and, in some implementations, function-level reachability analysis without embedding complex static-analysis logic locally. Technical advantages may include reduced duplication of analysis logic across tools, centralized maintenance of the reachability repository and vulnerability database, and the ability to provide consistent, up-to-date vulnerability assessments across different stages of the software development lifecycle.

The foregoing examples illustrate several ways in which pre-computed reachability datasets, graphs of reachable calls, and vulnerability information may be combined to produce reachability-aware vulnerability reports. These examples can be mixed and matched; for example, the same deployment can use pre-computed function-level datasets, graph-based transitive analysis and private dependency flattening, a shared reachability repository, component-level datasets, and an external API interface. Together, they support and enable the full scope of the method and system claims, while also providing concrete technical effects (e.g. improved performance, scalability, and precision of vulnerability analysis) useful to improve the functionality of a computer system.

The following sections describe an example environment, system components, and processing flows in further detail with reference to FIGS. 1-19.

For ease of exposition, a computer implemented reachability analysis system is referred to in this description as a reachability analysis system 120 or a reachability analysis system 200, and may be implemented as a service that precomputes reachability datasets for libraries and other software components, stores those datasets, and at project analysis time, generates reachability-based vulnerability reports based at least in part on those datasets. In the discussion of the figures below, examples are described in which reachability datasets are determined using function-level call-path tracing to provide greater detail. However, in other implementations, reachability may be determined and used based on component-level inclusion and configuration semantics, such as by accounting for build parameters, dependency scopes, or known configuration profiles that affect whether dependent components are included for a given project configuration. Such component-level reachability may be used alone or in combination with function-level reachability, and implementations that generate vulnerability reports using component-level reachability information (with or without function-level call-path tracing) are within the scope of this disclosure.

FIG. 1 illustrates a schematic diagram of an example environment 100 with one or more developer machines 110, a reachability analysis system 120, one or more external component repositories 130, one or more external vulnerability databases 140 with a network interconnecting these elements, in accordance with example embodiments of the disclosure.

Each developer machine 110 may execute an integrated development environment (IDE) 112, a build tool or continuous integration agent 114, and a project codebase 116. Developers may trigger builds or vulnerability checks via the build tool 114 or via a plug in or extension for the reachability analysis system 120 in the IDE 112.

The external component repositories 130 may include one or more public or private registries 132, 134, and 136, each of which stores artifacts (e.g., source, bytecode, or binaries) and metadata for libraries and other reusable software components. In the example of FIG. 1, the artifacts and metadata may be communicated as artifacts/metadata 152 to reachability analysis system 120. The reachability analysis system 120 may ingest data from the external component repositories 130 to populate an internal database of reachable functions of the artifacts, as described below.

The external vulnerability databases 140 may include an external vulnerability database 142 and optionally other feeds 144, such as vendor advisories or security research feeds, that describe known vulnerabilities. In the example of FIG. 1, the vulnerability information may be communicated as vulnerability data ingest 154 to reachability analysis system 120. The reachability analysis system 120 may ingest data from these sources to populate an internal database of vulnerable functions, described below.

The reachability analysis system 120 may include one or more network interfaces 122 and may expose one or more application programming interfaces (APIs) 124 that are reachable by developer machines 110 over the network. In typical operation, a build tool 114 may send a project dependency listing or manifest 118 to the reachability analysis system 120 and may receive a vulnerability report 126 in return. In some examples, the vulnerability report may be based on the internal database of reachable functions of the artifacts and the internal database of vulnerable functions.

Figure 2A:
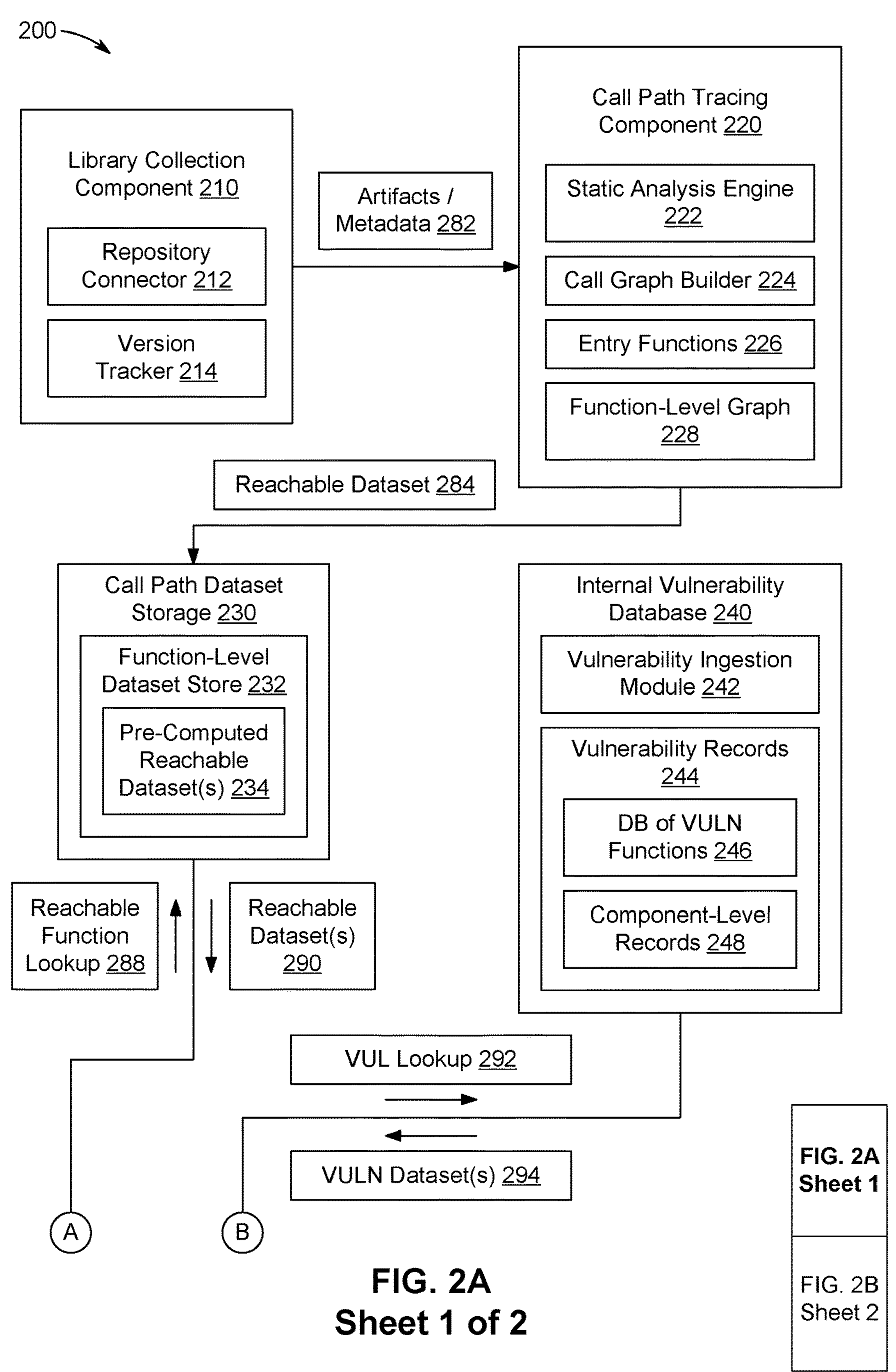
FIGS. 2A and 2B (Sheets 1 and 2) illustrates a block diagram of example functional components of a reachability analysis system, in accordance with example embodiments of the disclosure.
Figure 2B:
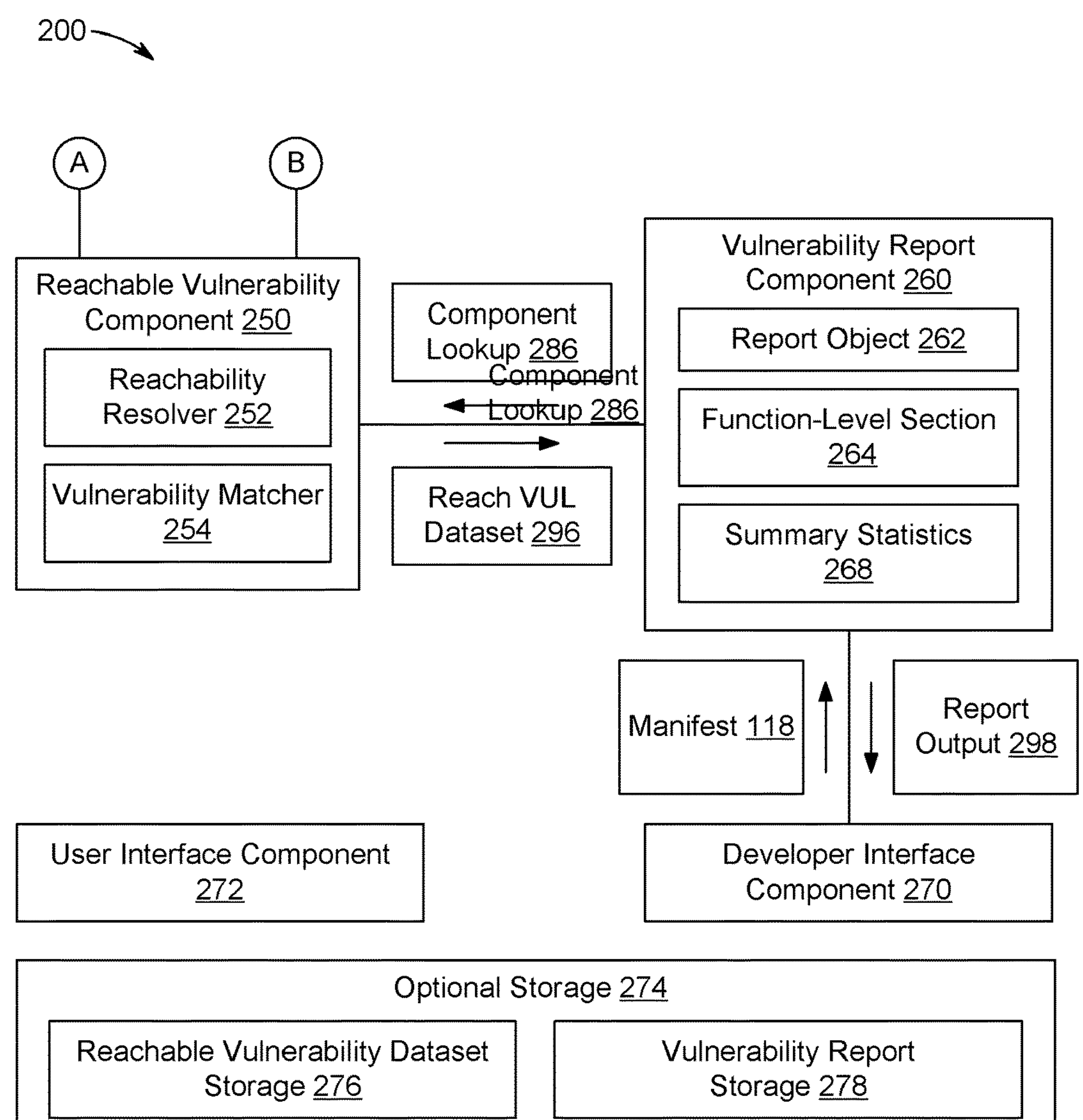

FIGS. 2A and 2B (Sheets 1 and 2) illustrates a block diagram of example functional components of a reachability analysis system 200, in accordance with example embodiments of the disclosure. As shown, the reachability analysis system 200 may be an example implementation of the reachability analysis system 120. The analysis system 200 may be implemented by one or more servers or services, and may include: a library collection component 210; a call path tracing component 220; call path dataset storage 230; an internal vulnerability database 240; a reachable vulnerability component 250; a vulnerability report component 260; a developer interface component 270; a user interface component 272; and an optional storage 274 that may include a reachable vulnerability dataset storage 276 and a vulnerability report storage 278.

These components may be implemented as software modules executed by one or more processors, as hardware modules, or as a combination thereof.

The library collection component 210 may obtain software components for reachability analysis. The component 210 may include a repository connector 212 that can fetch artifacts and metadata from external repositories 130, and a version tracker 214 that may maintain a list of known component identifiers and, where applicable, versions.

In some implementations, the library collection component 210 may periodically scan repositories 130 to detect new or updated components. For each component (and, optionally, for each detected version), the component 210 may download artifacts and metadata and provide artifacts/metadata 282 to the call path tracing component 220 for analysis.

The call path tracing component 220 may comprise a static analysis engine 222 and a call graph builder 224.

The static analysis engine 222 may accept artifacts from the library collection component 210 and may parse them into intermediate representations (IRs). For example, the engine 222 may parse virtual machine bytecode into control flow graphs and call sites, parse source code into abstract syntax trees, or disassemble native binaries into IR suitable for call analysis. In this way, the call path tracing may be based on static analysis of source code, bytecode, or binary artifacts.

From the IRs, the call graph builder 224 may identify functions (or methods) and call edges between them. The builder 224 may identify exported entry points of a component (e.g., public API methods) by examining language specific metadata or symbol information and may mark them as entry functions 226.

The call graph builder 224 may then perform inter procedural call path tracing from the entry functions 226 through functions in the first software component and into functions of dependent components. When the analysis encounters calls into a second software component (for example, another library), it may load or reference the call graph for that second component (if available) and continue tracing into functions in the second component. The tracing may continue into further dependent components, building a graph of reachable functions across multiple components.

Figure 5:
FIG. 5 illustrates an example graph diagram of a call path through the libraries of FIGS. 3-4B, showing reachable functions across multiple software components, in accordance with example embodiments of the disclosure.
Figure 5:
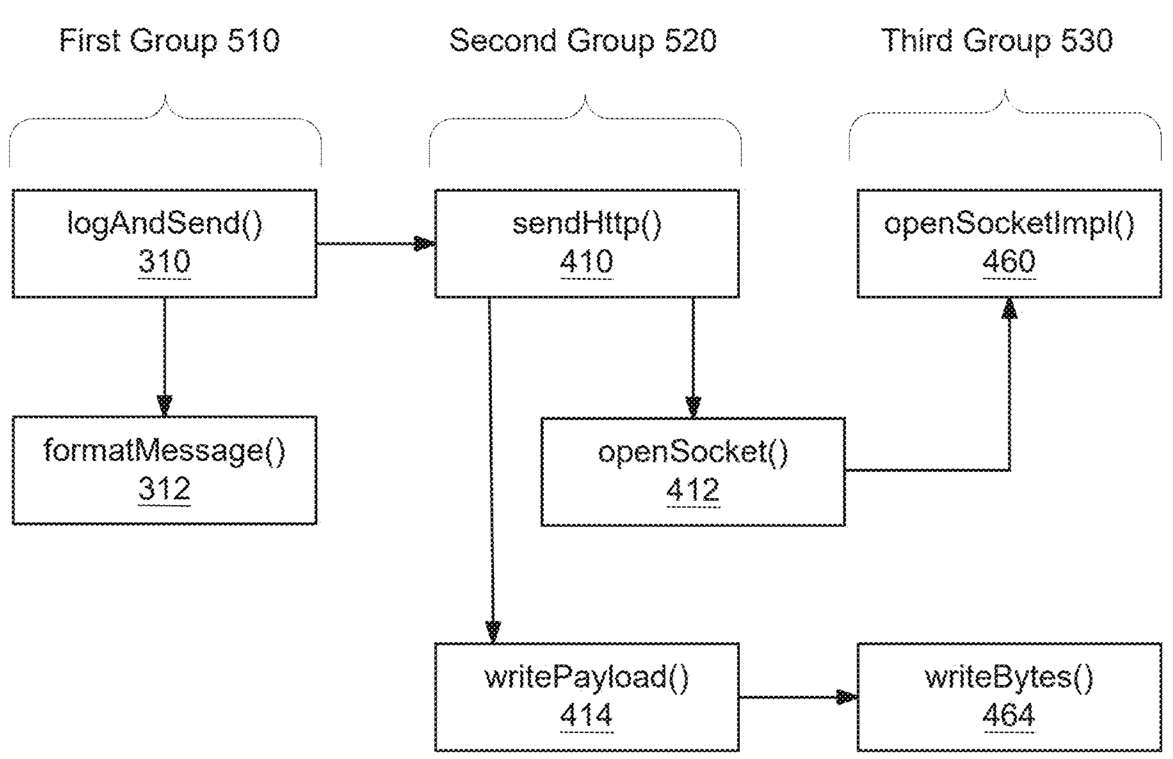
Figure 6:
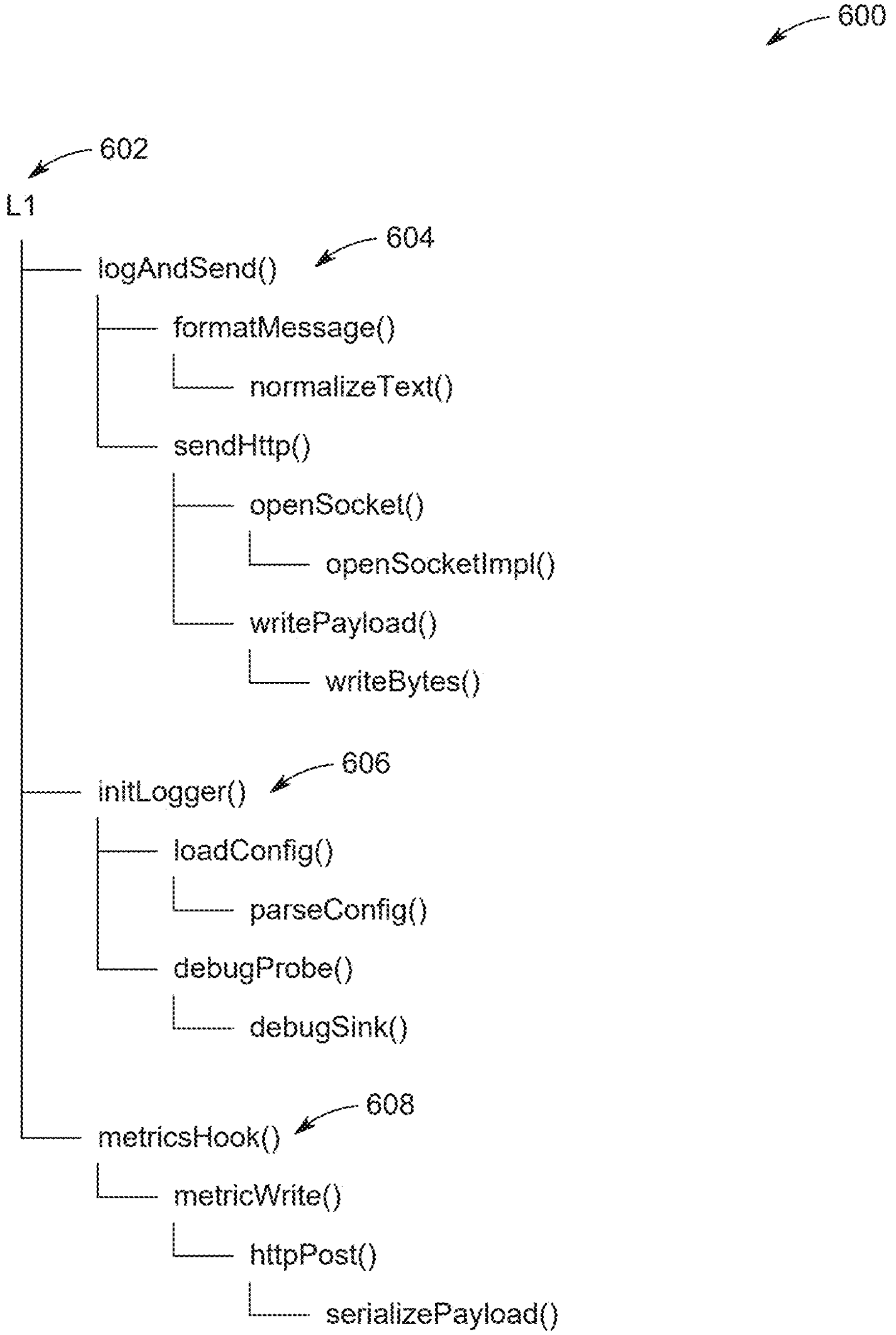
FIG. 6 illustrates an example tree diagram for the first-level library of FIG. 3, including example call paths through additional second- and third-level dependents, in accordance with example embodiments of the disclosure.

In some implementations, the call graph builder 224 may construct one or more function level graph(s) 228 which may be per-function as illustrated in FIG. 5 or may be component level call trees as illustrated in FIG. 6. Nodes in the graph may represent functions across multiple libraries, and directed edges may represent possible calls. The graph 228 may be used to determine which functions are reachable via call paths originating in the first software component, including functions in additional components reached transitively.

Once the call tracing is complete for a given first software component, the call path tracing component 220 may produce a reachable dataset 284 and may pass a set of identifiers for functions reachable from the first component's entry points to the call path dataset storage 230. The call path dataset storage 230 may maintain a function level dataset store 232, where, for each component (and, in some implementations, for each component/version pair), the system may store a pre-computed reachable dataset 234 listing the functions reachable from that component when used as a first software component. In some implementations, the stored pre-computed reachable dataset 234 may include a listing of reached functions (e.g., identifiers) without storing an associated call graph, while in other implementations the stored pre-computed reachable dataset 234 may additionally include call graph information (e.g., a function-level graph and/or edges) sufficient to represent or reconstruct call-path relationships. Of course, these are merely examples of the forms and content of the pre-computed reachable dataset 234 and other combinations and variations are within the scope of this disclosure.

In some implementations, the call path dataset storage 230 may additionally maintain summary or derivative structures, such as component level summaries or call graph indexes, derived from the underlying function level datasets 234. These structures may be used to accelerate lookups or to support alternative visualizations such as the component tree in FIG. 6.

The internal vulnerability database 240 may be built and maintained by a vulnerability ingestion module 242. The module 242 may periodically ingest raw vulnerability data from external vulnerability databases 142 and feeds 144, normalize and enrich that data, and create structured vulnerability records 244.

Some vulnerability records 244 may include a database of vulnerable functions 246. The database of vulnerable functions 246 may include function level records that associate a specific function identifier (for example, component, optional version, class, and method) with vulnerability metadata, such as a vulnerability identifier, severity, exploit conditions, and remediation recommendations. Additionally or alternatively, the vulnerability records may include component level records 248 that associate vulnerabilities with entire components or ranges of versions.

The vulnerability ingestion module 242 may, for example, analyze upstream vulnerability advisories and map them to function identifiers previously extracted by the static analysis engine 222 from libraries. The database of vulnerable functions 246 may be used to guide or constrain subsequent correlation between reachability information and vulnerability information.

The vulnerability report component 260 may receive a manifest 118 (e.g., a project dependency listing) and may coordinate generation of report output 298 based on reachability and vulnerability correlation. For example, upon receipt of the manifest 118, the vulnerability report component 260 may request a component lookup 286 from the reachable vulnerability component 250 to determine one or more reachable vulnerable dataset(s) 296 associated with software components identified by the manifest 118. For example, the component lookup 286 may identify one or more software components included in the manifest and, where applicable, versions and/or configurations.

The reachable vulnerability component 250 may perform a correlation between reachability data and vulnerability data. For example, based on the component lookup 286, the reachable vulnerability component 250 may perform a reachable function lookup 288 to obtain reachability data for the one or more software components and, where applicable, versions and/or configurations. More particularly, a reachability resolver 252 may issue the reachable function lookup 288 to request and/or fetch one or more pre-computed reachable datasets 234 from call path dataset storage 230. In response, the call path dataset storage 230 may provide the reachable dataset(s) 290 to the reachable vulnerability component 250. In some implementations, the reachable dataset(s) 290 may identify functions that would be reachable for a software project utilizing the one or more software components as dependencies.

The reachable vulnerability component 250 may then perform a vulnerability lookup 292 to obtain vulnerability data for the reachable dataset(s) 290. A vulnerability matcher 254 may request vulnerability information from internal vulnerability database 240, including performing a vulnerability lookup 292 against the database of vulnerable functions 246 based on the reachable dataset(s) 290 and/or the component(s) lookup 286. The reachable vulnerability component 250 may then receive one or more vulnerability dataset(s) 294. Depending on the implementation, the vulnerability dataset(s) 294 may be specific to the reachable functions or may include the vulnerability for the components of the component(s) lookup 286. In the former case, based on the reachability information obtained from call path dataset storage 230 and the vulnerability information obtained from internal vulnerability database 240, the reachable vulnerability component 250 may determine vulnerable functions of the reachable functions. The reachable vulnerability component 250 may then compute one or more reachable vulnerable dataset(s) 296 including the information about matched vulnerable functions (and, optionally, vulnerable components). The reachable vulnerability component 250 may provide the one or more reachable vulnerable dataset(s) 296 to the vulnerability report component 260. In some examples, individual reachable vulnerable dataset(s) 296 may be specific to corresponding software component(s) listed in the component(s) lookup 286.

The vulnerability report component 260 may receive information about matched vulnerable functions (and, optionally, vulnerable components), including the one or more reachable vulnerable dataset(s) 296, and may construct a vulnerability report object 262. The vulnerability report object 262 may include the vulnerability information for each component listed in the manifest 118 in various formats. In some examples, the vulnerability report object 262 may include a function level section 264 and summary statistics 268. The vulnerability report component 260 may store reports in vulnerability report storage 278 and may provide the report output 298 for delivery via the developer interface component 270.

The developer interface component 270 may be used by the build systems, continuous integration pipelines, and developer tools of the developer machines 110. In some implementations, a build system may send a project dependency listing (manifest) 118 to the reachability analysis system 120 via API(s) 124 of FIG. 1 using the developer interface component 270, and the developer interface component 270 may provide the manifest 118 for processing as described above and return a vulnerability report 126, which may correspond to report output 298.

The user interface component 272 may render reports via a web console or dashboard and may provide an interface by which users of the analysis system 200 can control the various functions previously described, including initiating or configuring collection and analysis operations, selecting reporting options, and viewing stored outputs.

The reachable vulnerability dataset storage 276 may cache results of correlation, such as reachable vulnerable datasets per component or per project, so that subsequent queries may be handled with reduced latency.

Though example implementation details are discussed above with reference to FIGS. 2A and 2B, variations are possible.

For example, the system may compute and store, in the reachable vulnerability dataset storage 276, one or more precomputed reachable vulnerable datasets (e.g., reachable vulnerable dataset 296) that associate vulnerability information with reachable functions identified from pre-computed reachable dataset 234. In such examples, the stored reachable vulnerable datasets may be reused across multiple project analyses, including analyses initiated by receipt of a manifest 118, without repeating vulnerability matching for each project.

Alternatively, reachability information and vulnerability information may be combined during precomputation and stored as a distinct artifact. For example, the vulnerability ingestion module 242 and/or reachable vulnerability component 250 may annotate reachable functions derived from pre-computed reachable dataset 234 using vulnerability records 244 (e.g., from the database of vulnerable functions 246), and store the resulting reachable vulnerable datasets in the reachable vulnerability dataset storage 276 for reuse. Hybrid approaches may also be used, such as by precomputing and storing reachable vulnerable datasets for selected software components while computing other reachable vulnerable datasets on demand during project analysis.

Further, when vulnerability information changes over time, the system may update or regenerate reachable vulnerable datasets using any of multiple mechanisms. For example, the system may maintain a vulnerability-information version identifier (e.g., per component, per version range, per vulnerability source, or per ingestion batch) associated with the vulnerability records 244 and/or vulnerability dataset(s) 294. In such examples, a stored reachable vulnerable dataset in reachable vulnerability dataset storage 276 may include a corresponding version identifier indicating the vulnerability-information version used when the dataset was generated, and during project analysis the reachable vulnerability component 250 may compare the dataset's version identifier to the current vulnerability-information version. If the stored dataset is determined to be out of date, the system may regenerate the dataset by re-performing vulnerability lookup 292 and re-deriving the reachable vulnerable dataset(s) 296 from the current database of vulnerable functions 246 and the applicable pre-computed reachable dataset 234. In other implementations, the system may proactively identify affected software components and refresh corresponding stored reachable vulnerable datasets when the internal vulnerability database 240 is updated.

While implementations discussed above may store a pre-computed reachable dataset that includes reachability across multiple transitive layers, other implementations may store a reduced-scope pre-computed reachable dataset that includes only second-level reachable functions (e.g., reachable functions of directly dependent components). In such examples, deeper reachability may be computed during project analysis by merging or composing reachability information across levels, such as by obtaining multiple pre-computed reachable datasets from call path dataset storage 230 and combining them based on reachability at each level. For example, the system may obtain reduced-scope pre-computed reachable datasets for a first-level component and for one or more second-level and lower-level components (e.g., based on known dependency data of the first level components identified by the manifest), and may iteratively apply reachability from a the first level (or prior level) to select only those functions in the next level that are reachable from the prior level. In this manner, the system may follow cross-component call relationships from the first level component through one or more dependent components (e.g., L2 to LX) by propagating the reachable function set forward layer-by-layer. While such an alternative is more computationally intensive than retrieving a dataset specifying the reachable functions of all levels at project analysis time, this layered merging may construct the full transitive reachability with vastly reduced computation relative to performing call-path tracing during project analysis.

As mentioned above, the system may account for build parameters, dependency scopes, and configuration semantics when determining which components and call paths are relevant for reachability and vulnerability reporting. For example, the manifest 118 may include build-parameter fields, dependency scopes, or configuration selectors, and the developer interface component 270 may parse these parameters and pass them to the reachable vulnerability component 250 so that reachability and vulnerability correlation is limited to dependencies that are included for the specified configuration. In one example, some software components (e.g., open source libraries) may have known build parameters and dependency-scope semantics used by end users of the component (e.g., developers of the software project) that exclude potential dependent software components from being included in a live build, such as dependencies used for testing, debugging, or tooling of the library itself but not included in runtime builds. In such examples, the system may leverage component-level reachability data (e.g., component-level summaries derived from pre-computed reachable dataset 234) to exclude those dependent software components that would otherwise be included by a collection of all dependent software components, thereby excluding corresponding functions and associated vulnerabilities without performing function-level reachability analysis for those excluded components. Such an alternative, while not as precise as function-level reachability, may be superior to approaches that report vulnerabilities from software components that would not be included in a live build of the software project. In other implementations, for a reusable software component, the system may maintain pre-set build parameters or configuration profiles associated with that component and compute multiple variants of pre-computed reachable dataset 234 corresponding to different configurations, and select an applicable variant during project analysis based on parameters derived from the manifest 118 and/or the component's configuration profile.

Additionally, rather than treating functions as only reachable or unreachable, the system may classify functions and associated vulnerabilities into multiple categories and organize reporting accordingly. For example, vulnerabilities may be categorized as "reachable" when supported by call paths represented in the function-level reachability information, "unreachable" when no call path is present, and "potentially reachable" when reachability depends on conditions not fully resolved by static analysis, and the vulnerability report component 260 may organize report content accordingly in the function-level section 264 and summary statistics 268.

In some implementations, rather than performing call-path tracing solely using static analysis of source code, bytecode, or binary artifacts, the system may perform at least a portion of the call-path tracing using dynamic analysis. For example, a first software component and one or more dependent software components may be executed in a runtime environment, and call-path information may be derived from observed execution behavior, such as by collecting call events produced during execution of one or more test runs, workloads, or instrumented executions. In such examples, the observed call-path information may be used to compute, update, or supplement a pre-computed reachable dataset (and, in some implementations, a reachable vulnerable dataset) associated with the first software component, and may be combined with vulnerability information during report generation as described above.

Finally, the system may be implemented in a distributed manner, with one or more components of FIGS. 2A and 2B deployed across multiple computing nodes. For example, call path dataset storage 230, internal vulnerability database 240, reachable vulnerability dataset storage 276, and vulnerability report storage 278 may be distributed and accessed over networked interfaces, and different services may independently scale collection, analysis, storage, and report generation while still cooperating to generate report output 298 in response to receipt of manifest 118 submissions.

Figure 3:
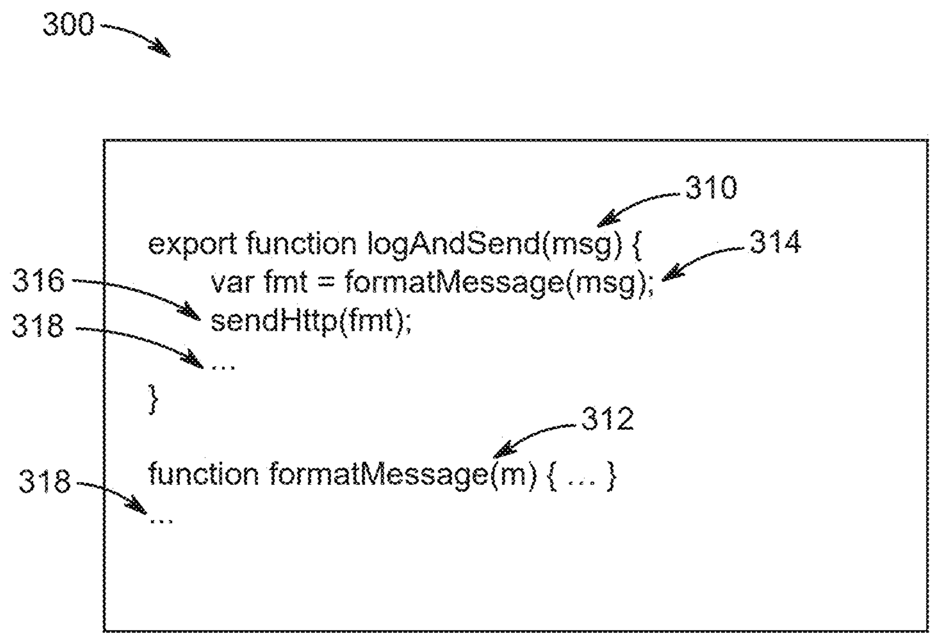
FIG. 3 illustrates an example code listing for a first-level library including at least one function and internal calls that begin a call path into dependent libraries, in accordance with example embodiments of the disclosure.
Figure 4A:
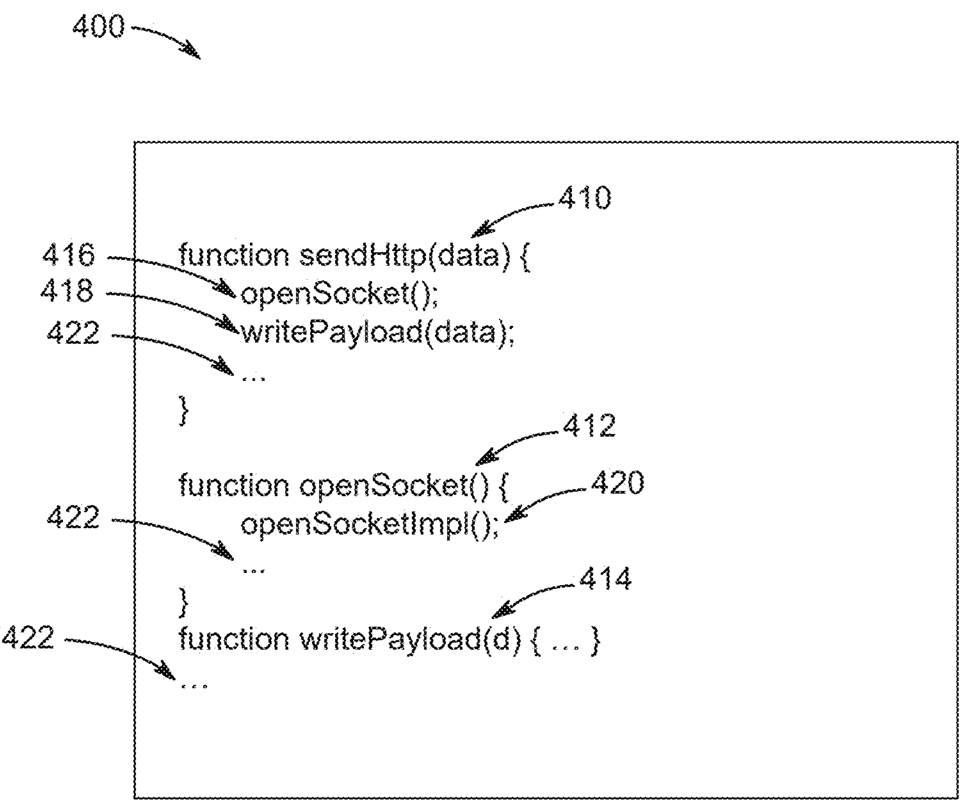
FIG. 4A illustrates an example code listing for a second-level dependent library of the first-level library of FIG. 3, in accordance with example embodiments of the disclosure.
Figure 4B:
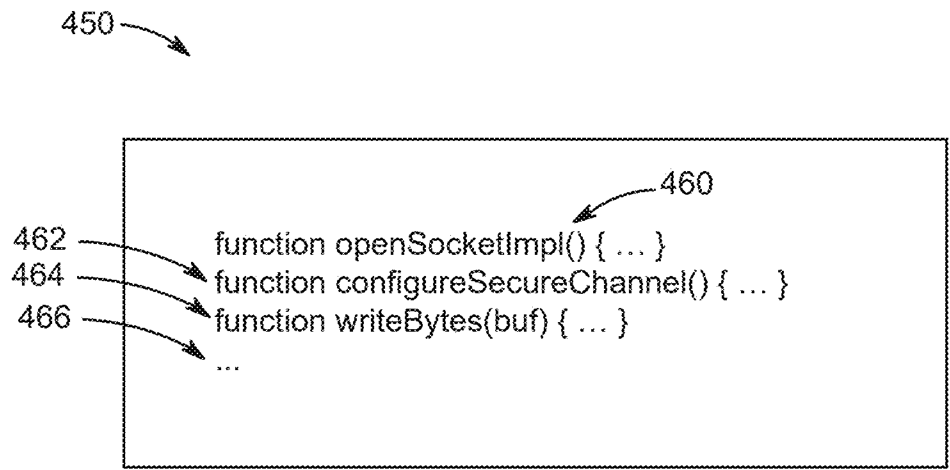
FIG. 4B illustrates an example code listing for a third-level dependent library of the second-level library of FIG. 4A, in accordance with example embodiments of the disclosure.

FIGS. 3-4B illustrate example collapsed code listings, including ellipses that omit unneeded details while showing code to illustrate at least one example call path from a first-level library to a third-level library.

FIG. 3 shows an example code listing 300 for a first level library including at least one function and internal calls that begin a call path into dependent libraries, in accordance with example embodiments of the disclosure.

The listing 300 includes an exported function logAndSend( ) 310, which may serve as an exported entry point of a first software component.

The function logAndSend( ) 310 may call 314 an internal helper function formatMessage( ) 312, and then may call 316 an external function sendHttp( ) provided by a second level library. Ellipses 318 may indicate additional code not relevant to the illustration.

During call path tracing, the static analysis engine 222 may identify logAndSend( ) 310 as an entry function, and may resolve the call 316 from logAndSend( ) 310 to sendHttp( ) as a cross component call to the second level library.

FIG. 4A illustrates an example code listing 400 for a second-level dependent library of the first-level library of FIG. 3, in accordance with example embodiments of the disclosure. More particularly, code listing 400 may include example code for a second level library L2 that may implement network communication.

The listing 400 may include a function sendHttp( ) 410, which receives a message and constructs a network request, and may call internal functions such as call 416 to openSocket( ) 412 and a call 418 to writePayload( ) 414. Similarly, openSocket( ) 412 may call 420 an external function openSocketImpl( ) provided by a third level library. Ellipses 422 may again indicate omitted code.

The static analysis engine 222 may parse the listing 400, create function nodes for sendHttp( ) 410, openSocket( ) 412, and writePayload( ) 414, and add edges indicating that sendHttp( ) 410 may call openSocket( ) 412 and writePayload( ) 414 and that openSocket( ) 412 may call openSocketImpl( ) in the third level library. The static analysis engine 222 may further resolve the call 420 from openSocket( ) 412 to openSocketImpl( ) as a cross component call to the third level library.

FIG. 4B illustrates an example code listing 450 for a third-level dependent library of the second-level library of FIG. 4A, in accordance with example embodiments of the disclosure. More particularly, code listing 450 may include example code for a third level library L3, such as a lower level socket or secure transport library.

The listing 450 may include functions openSocketImpl( ) 460, configureSecureChannel( ) 462, and writeBytes( ) 464, with ellipses 466 representing omitted implementation details.

In some implementations, openSocket( ) 412 may call openSocketImpl( ) 460, and writePayload( ) 414 may call writeBytes( ) 464, forming a multi level call path from logAndSend( ) 310 down into functions in L3.

FIG. 5 shows a function level call graph 500 for the libraries of FIGS. 3-4B and particularly for the logAndSend( ) entry point of the first level library, as constructed by the call graph builder 224, in accordance with example embodiments of the disclosure.

Nodes 510 in a first group represent functions of the first level library L1, including logAndSend( ) 310 and formatMessage( ) 312. Nodes 520 in a second group represent functions of the second level library L2, including sendHttp( ) 410, openSocket( ) 412, and writePayload( ) 414. Nodes 530 in a third group represent functions of the third level library L3, including openSocketImpl( ) 460 and writeBytes( ) 464.

The directed edges represent call relationships discovered by the static analysis engine 222, as illustrated by arrows between nodes. For example, the call graph 500 illustrates that logAndSend( ) 310 calls sendHttp( ) 410 and formatMessage( ) 312, that sendHttp( ) 410 calls openSocket( ) 412 and writePayload( ) 414, that openSocket( ) 412 calls openSocketImpl( ) 460, and that writePayload( ) 414 calls writeBytes( ) 464.

In the example of FIG. 5, functions reachable via at least one call path originating in logAndSend( ) 310 include logAndSend( ) 310, formatMessage( ) 312, sendHttp( ) 410, openSocket( ) 412, writePayload( ) 414, openSocketImpl( ) 460, and writeBytes( ) 464. Functions not reachable from logAndSend( ) 310 may be treated as non-reachable functions, including, for example, configureSecureChannel( ) 462 (not included in the tree).

The call graph builder 224 may determine reachability by performing a graph traversal from entry nodes corresponding to exported functions and marking visited nodes as reachable, and identifiers of reachable functions may be collected into the pre-computed reachable dataset 234 for the first level library.

FIG. 6 illustrates an example tree diagram 600 for call tree for the first-level library L1, including example call paths through additional second- and third-level dependents, in accordance with example embodiments of the disclosure.

The call tree 602 may represent, in a combined structure, call-path tracing results for multiple functions of the first level library, such that each of multiple entry functions of the first level library is represented as a separate branch (e.g., branches 604, 606, and 608) beneath the root of the call tree 602.

In this example, a first branch 604 corresponds to a first L1 function (e.g., logAndSend( ) 310) and expands to show calls into one or more dependent libraries (e.g., via sendHttp( ) 410, openSocket( ) 412, and writePayload( ) 414) and further into transitive dependencies (e.g., openSocketImpl( ) 460 and writeBytes( ) 464). Other branches 606 and 608 correspond to other L1 functions and similarly expand to show their respective call paths including, in some examples, into dependent libraries of L1 other than L2 and L3. In this manner, the call tree 600 illustrates how call-path tracing for multiple L1 functions may be combined into a unified representation for the L1 library while still preserving per-entry-function branching.

The component level call tree 600 may be derived from function level data by mapping each reachable function to its parent component and aggregating. In some implementations, such derived component level views may be used for visualization, summarization, or optimization, while reachability remains represented at the function level.

Figure 7:
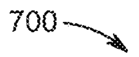
FIG. 7 illustrates a block diagram of an example database diagram of a library call-path dataset, in accordance with example embodiments of the disclosure.

FIG. 7 illustrates an example database diagram 700 of a call-path dataset, in accordance with example embodiments of the disclosure.

As shown, a database diagram 700 illustrates records in the call path dataset storage 230. A table 710 may include rows such as a row 712 for a component L1 and, in some implementations, a row 714 for a particular version of that component. Columns may include a component identifier field 720, an optional version identifier field 722, and a dataset reference field 724 (e.g. pointers P1 and P2) which may point to stored reachable function data (for example, a serialized bitset or list of function identifiers). In some implementations, the datasets stored in the call-path dataset may store, on a per-component basis, call-path data corresponding to call trees such as the example call tree of FIG. 6, such that a stored dataset can support reconstruction of branches from entry points to reached functions. In other implementations, the stored data may omit tree or graph structure and instead store only a listing (or other representation) of reachable functions (e.g., identifiers of reached functions) for the component.

Additional variations in the form and content of the stored data, including variants in which reachability information is stored alone or in combination with vulnerability information, are described above with reference to FIGS. 2A and 2B.

For each component (and, where applicable, for each version), the call path tracing component 220 may compute a pre-computed reachable dataset and store a reference in field 724. In some implementations, additional columns may record the number of reachable functions, timestamps, and hash values of analyzed artifacts. Version specific datasets may be used when a project dependency listing specifies particular versions for components.

Figure 8:
FIG. 8 illustrates a block diagram of an example vulnerability-database entry diagram for a subset of the functions shown in the previous figures, in accordance with example embodiments of the disclosure.

FIG. 8 shows an example vulnerability database diagram 800 for a subset of the functions shown in the previous figures, in accordance with example embodiments of the disclosure. A function-level vulnerability table 810 may include records such as a record 812 for function openSocketImpl( ) 460 and a record 814 for function configureSecureChannel( ) 462. Each record may include a function identifier 820 (for example, component name, optional version, class, and method), one or more vulnerability identifiers 822 of vulnerabilities in the internal vulnerability database 240 or in a CVE database, a severity field 824, and optional metadata 826.

In the illustrated example, record 812 associates openSocketImpl( ) 460 with a vulnerability identifier ID1 having a severity of Moderate and metadata M1. Record 814 associates configureSecureChannel( ) 462 with multiple vulnerability identifiers (e.g., ID2 and ID3) having respective severities of High and Extreme and corresponding metadata M2 and M3. In some implementations, M1, M2, and M3 may represent one or more metadata fields such as affected version ranges, exploitability indicators or conditions, references to external advisories, remediation recommendations, or other normalized attributes derived during ingestion.

These records may constitute the database of vulnerable functions 246. The vulnerability ingestion module 242 may populate table 810 based on external data and internal analysis.

In some implementations, a separate table may list component-level vulnerability records 248, associating a component and, optionally, a version with a vulnerability, and such component-level records may be used as an additional signal when interpreting function-level reachability.

FIG. 9 illustrates a block diagram 900 of an example manifest or project dependency listing 902 for a software project, in accordance with example embodiments of the disclosure.

In some examples, the manifest or project dependency listing 902 may be produced by a build system or package manager. The listing 902 may include entries 910, 912, 914, each specifying a component name 920 and, in some cases, a version 922, and optionally a scope or configuration 924.

For example, entry 910 may identify L1 and an associated version, entry 912 may identify a framework component, and entry 914 may identify a database driver component. The manifest 902 may serve as the project dependency listing used by the reachability analysis system 120 to select appropriate pre-computed reachable datasets 234 and relevant vulnerability information.

The developer interface component 270 may receive the manifest 902 in raw form (for example, as a build tool specific file) and may normalize it into an internal project dependency listing structure before passing it to the reachable vulnerability component 250.

FIG. 10 illustrates a block diagram of an example vulnerability report 1000 generated based at least in part on pre-computed reachability datasets and vulnerability data, in accordance with example embodiments of the disclosure.

In some examples, the example vulnerability report 1000 may be generated by the vulnerability report component 260. The report 1000 may include a summary pane 1010 showing counts of vulnerabilities by severity and by component 1012; a function level vulnerability table 1020 listing vulnerable functions 1022, associated components 1024, severity 1026, and example call paths 1028; and, in some implementations, additional summary views 1030 and reachability indicator/view 1034. A remediation suggestions section 1040 may propose actions such as upgrading to a non-vulnerable version or disabling a specific code path.

The report 1000 may be generated based at least in part on one or more pre-computed reachable datasets 234 and the database of vulnerable functions 246, as described above.

The example vulnerability report 1000 of FIG. 10 is provided for illustration only. The particular arrangement, format, level of detail, and selection of information depicted in the example report 1000 is non-limiting, and implementations of the disclosed subject matter are not limited to generating reports having the specific fields, sections, organization, or presentation shown. In various implementations, a vulnerability report may include additional, fewer, or different items of information, may omit one or more items of information depicted in FIG. 10, and/or may present information in any suitable format, structure, or medium based on the needs of a given environment or workflow.

Figure 11:
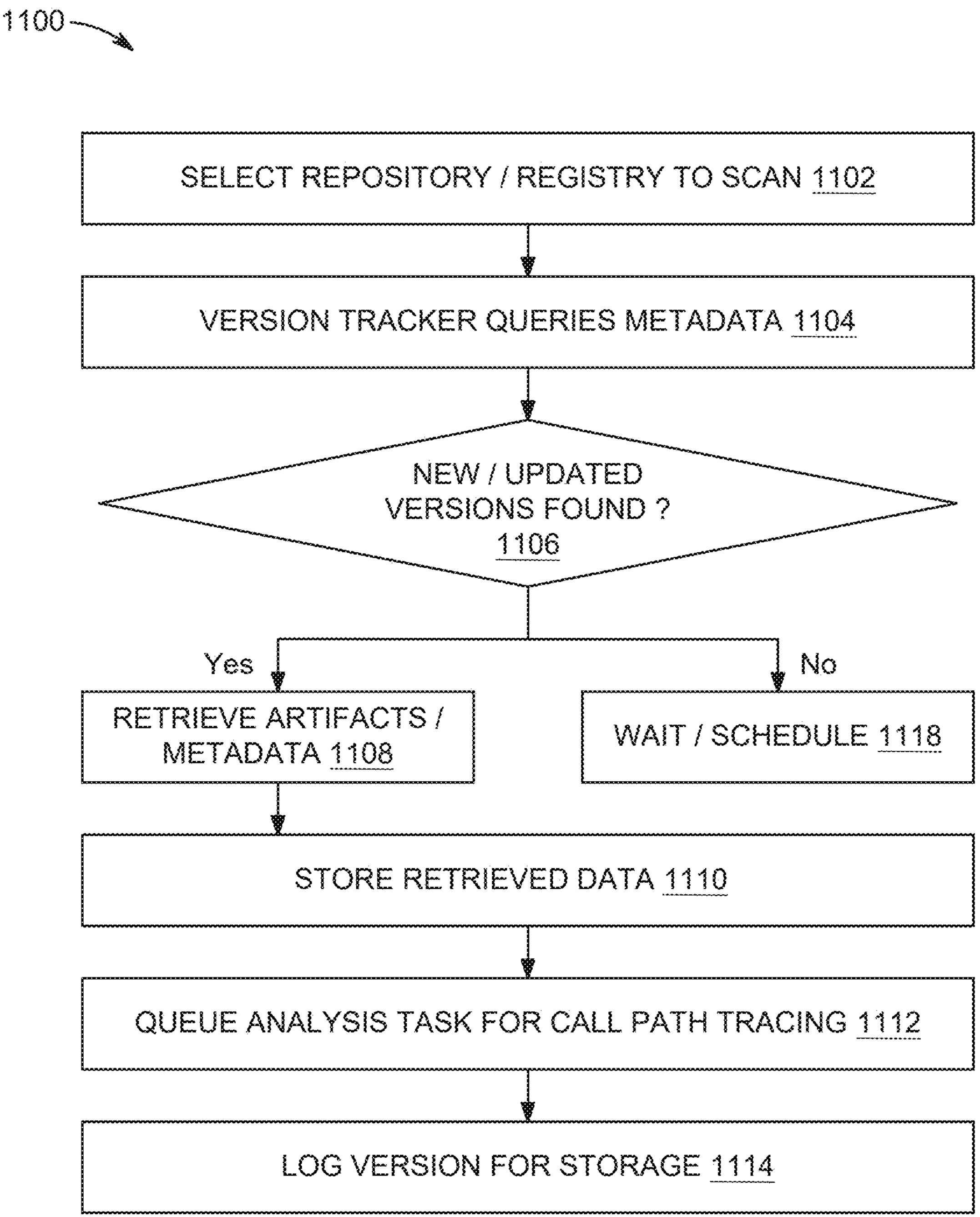
FIG. 11 illustrates a flow diagram of an example method to collect libraries, including checking for updated versions of libraries and updating a library repository, in accordance with example embodiments of the disclosure.

FIG. 11 illustrates a flow diagram 1100 of an example method to collect libraries, including checking for updated versions of libraries and updating a library repository, in accordance with example embodiments of the disclosure. In some examples, the operations of FIG. 11 may be performed by the library collection component 210.

At block 1102, the analysis system 200 may select a repository or registry to scan, such as a public or private component repository. At block 1104, the version tracker 214 may query for metadata describing available components and versions.

At block 1106, the library collection component 210 may determine whether new or updated versions have been discovered that are not yet present in the call path dataset storage 230. If no new versions are found, the process may wait or schedule a later check (block 1118). If a new or updated version is found, at block 1108, the component 210 may retrieve the corresponding artifacts and metadata, and at block 1110 may store the retrieved data.

At block 1112, the component 210 may queue an analysis task for the call path tracing component 220, passing identifiers for the component and, if applicable, the version, and locations of retrieved artifacts. Optionally, at block 1114, the component 210 may log the new version in a library repository index, including hash values and timestamps that may later be stored in the call path dataset storage 230. The flow 1100 may then return to block 1102 or 1118 for continued monitoring.

Figure 12:
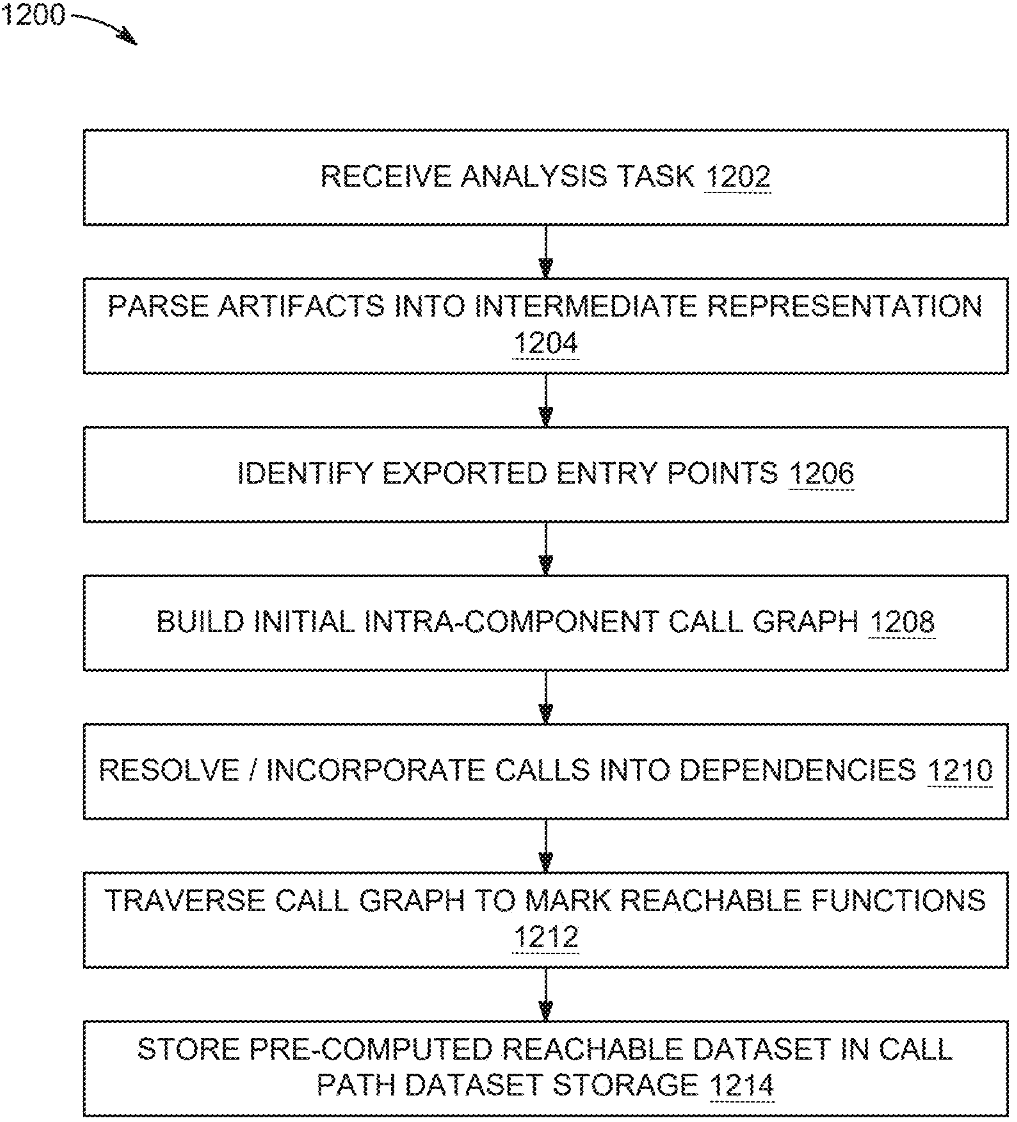
FIG. 12 illustrates a flow diagram of an example method to create call-path datasets for a library, including creating call paths through dependent libraries as those dependencies are triggered in the call-path tracing, in accordance with example embodiments of the disclosure.

FIG. 12 illustrates a flow diagram 1200 of an example method to create call-path datasets for a library, including creating call paths through dependent libraries as those dependencies are triggered in the call-path tracing, in accordance with example embodiments of the disclosure. In some examples, the operations of FIG. 12 may perform a call path tracing and may be performed by the call path tracing component 220.

At block 1202, an analysis task may be dequeued for a component (and, in some cases, a component/version pair). At block 1204, the static analysis engine 222 may parse the component's artifacts into an intermediate representation, producing function definitions and call sites.

At block 1206, the engine 222 may identify exported entry points 226 by scanning for public functions or methods that are externally visible in the packaging format.

At block 1208, the call graph builder 224 may construct an initial intra component call graph. At block 1210, the builder 224 may resolve and incorporate calls into dependencies by matching import references to functions in second level libraries (for example, resolving the call 316 from logAndSend( ) 310 to sendHttp( ) 410) and then recursively building or loading call graphs for those dependencies.

At block 1212, the builder 224 may perform a reachability traversal (for example, depth first search or breadth first search) from entry point nodes. Nodes visited during this traversal may be marked as reachable. In some implementations, a bitset representation or similar representation other than a graph or tree structure may be used to track reachability, where each function identifier maps to a bit position, and scanning for set bits may identify reachable functions efficiently.

At block 1214, the call path tracing component 220 may construct the pre-computed reachable dataset 234 for the component (and, optionally, version) and may pass it to the call path dataset storage 230, which may store it as an entry in the table 710 of FIG. 7. The dataset may also record path summaries or edges used for later explanation in reports, thereby supporting call path explanations in FIG. 10.

Figure 13:
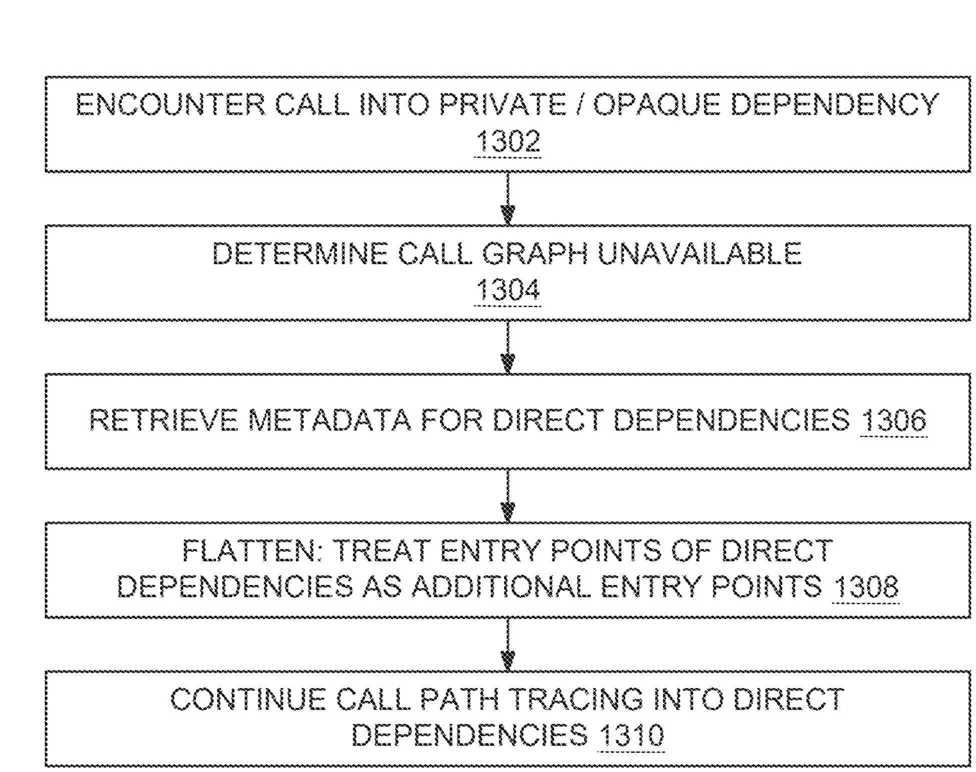
FIG. 13 illustrates a flow diagram of an example method to handle private dependencies, showing a flattening mechanism when call graphs are unavailable, in accordance with example embodiments of the disclosure.

FIG. 13 illustrates a flow diagram 1300 of an example method to handle private dependencies, showing a flattening mechanism when call graphs are unavailable, in accordance with example embodiments of the disclosure. In some examples, the operations of FIG. 13 may implement a flattening mechanism for private or opaque dependencies and may be implemented by the call path tracing component 220.

At block 1302, the call graph builder 224 may encounter a call into a dependency for which full artifacts are unavailable or opaque (e.g., a private dependency hosted in a restricted repository). At block 1304, the system may determine that it cannot construct a full internal call graph for the private dependency because source or bytecode is unavailable.

At block 1306, the library collection component 210 may retrieve dependency metadata for the private dependency, such as a list of its own direct dependencies. At block 1308, the call path tracing component 220 may flatten the private dependency by designating exported entry points of those direct dependencies as additional entry points for call path tracing. That is, instead of treating the private dependency solely as an opaque node, the system may shift the focus to its publicly known downstream dependencies.

At block 1310, the call graph builder 224 may continue call path tracing into the direct dependencies using those additional entry points, thereby discovering reachable functions in downstream libraries even though the internal structure of the private dependency itself is unknown.

Figure 14:
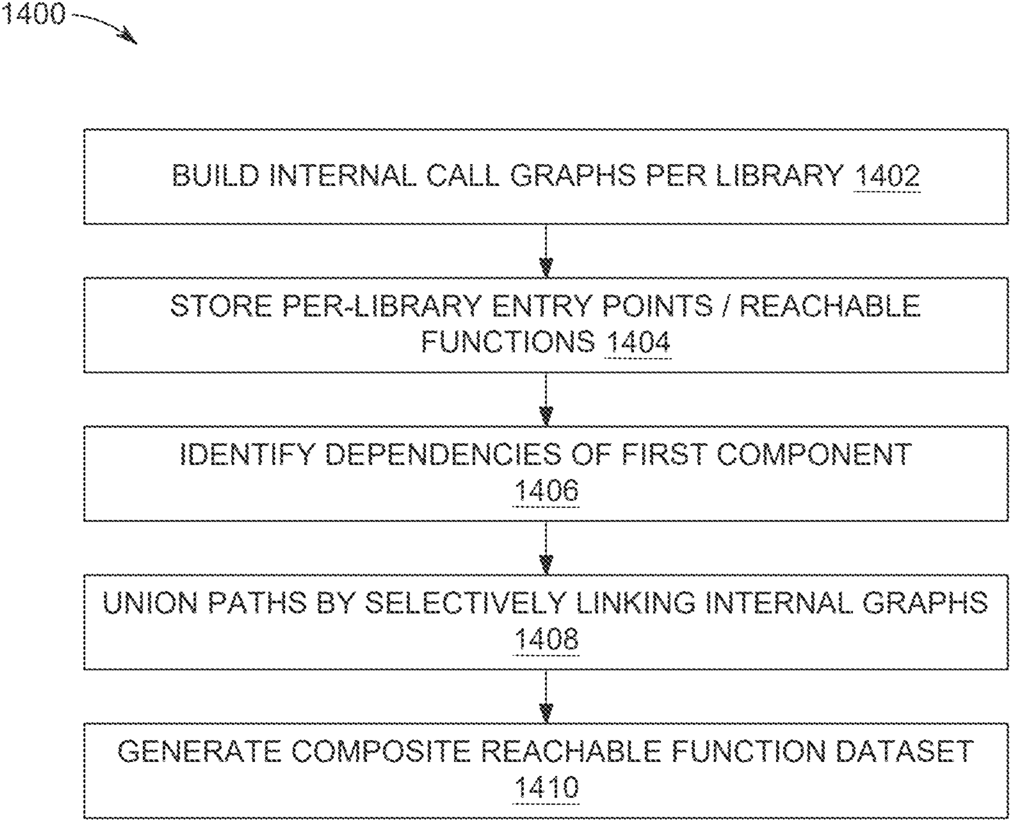
FIG. 14 illustrates a flow diagram of an example alternative method in which internal call paths are created per library and unions of paths are computed selectively from sets of call paths without tracing all dependencies for each dataset creation, in accordance with example embodiments of the disclosure.

FIG. 14 illustrates a flow diagram 1400 of an example alternative method in which internal call paths are created per library and unions of paths are computed selectively from sets of call paths without tracing all dependencies for each dataset creation, in accordance with example embodiments of the disclosure.

At block 1402, the static analysis engine 222 may construct internal call graphs for each library independently, without initially traversing across dependencies. For example, the engine 222 may build an intra library call graph for L1, another for L2, and another for L3.

At block 1404, the system may store, for each library, an internal dataset of entry points and reachable functions including internal functions of the particular library and called functions in direct dependencies of that particular library. At block 1406, when a first software component is designated as the root for reachability (for example, L1), the system may identify all dependencies of that component from metadata (such as a manifest or configuration).

At block 1408, the system may compute a union of paths by selectively linking internal graphs from root to transitive dependencies, using the internal dataset of reachable functions to identify which calls are possible across library boundaries (e.g., by using the called functions in direct dependencies of that particular library). This may be recursively performed with subsequent levels limited in selection of further dependency calls to those that occurred in functions called by the prior level. At block 1410, the system may then generate a composite reachable function dataset 234 for the first software component based on the union of internal paths.

This alternative method may be used alone or in combination with the direct tracing of FIG. 12.

Figure 15:
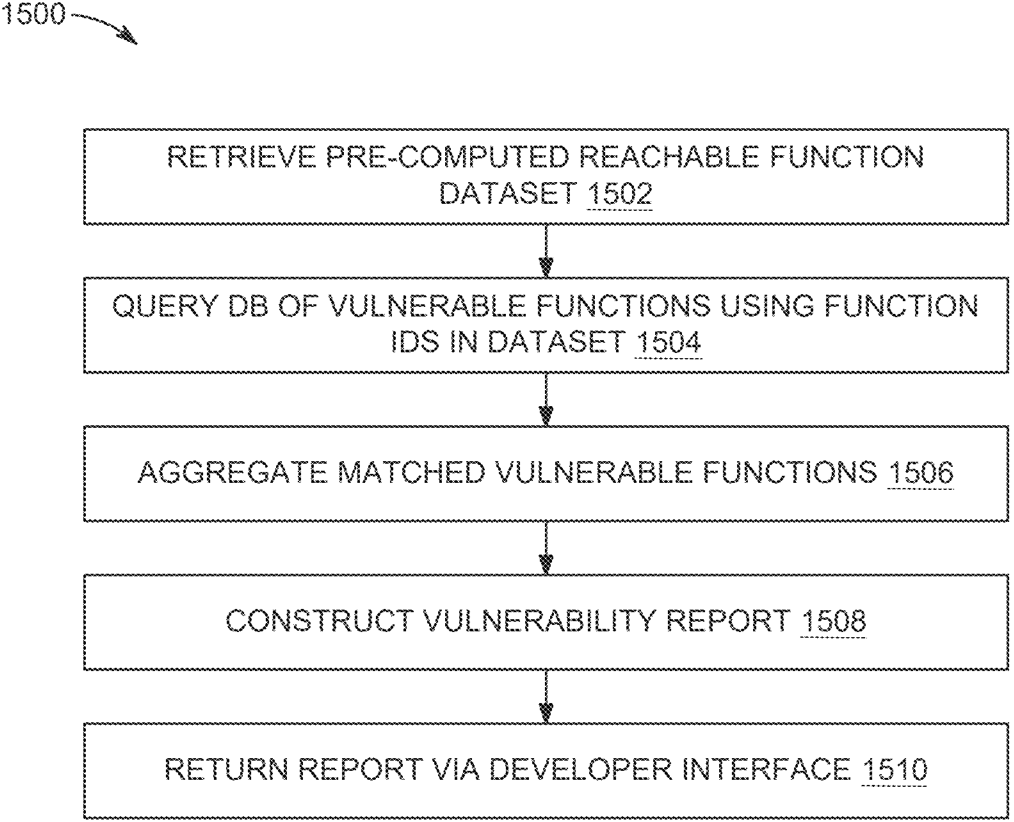
FIG. 15 illustrates a flow diagram of an example method to collect vulnerability data for reached functions and to generate a vulnerability report, in accordance with example embodiments of the disclosure.

FIG. 15 illustrates a flow diagram 1500 of an example method to collect vulnerability data for reached functions and to generate a vulnerability report, in accordance with example embodiments of the disclosure.

At block 1502, given a project dependency listing 902, the reachable vulnerability component 250 may resolve a first software component of interest (for example, L1) and may retrieve the corresponding pre-computed reachable dataset 234 from the function level dataset store 232.

At block 1504, the vulnerability matcher 254 may query the database of vulnerable functions 246 for records whose function identifiers match functions in the dataset 234. Because the dataset 234 may be pre-restricted to reachable functions, this correlation may automatically filter out vulnerabilities that affect non reachable functions.

At block 1506, the system may aggregate the results into a set of matched vulnerable functions, and at block 1508, the vulnerability report component 260 may construct the vulnerability report 1000 with appropriate sections and formatting.

At block 1510, the developer interface component 270 may return the report to the requesting client, for example as an API response.

Figure 16:
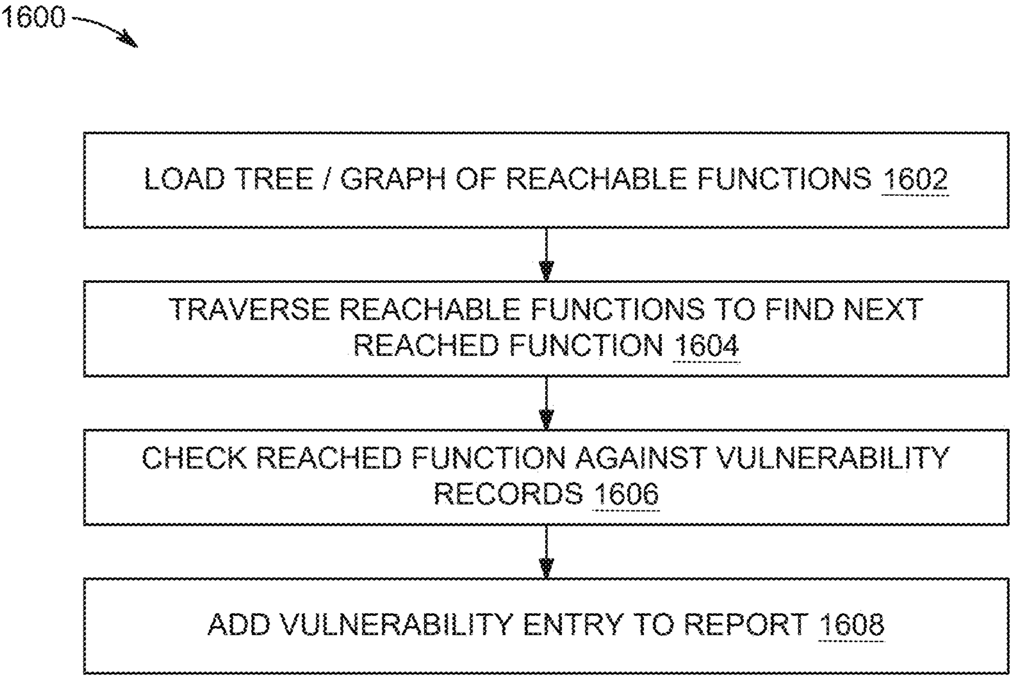
FIG. 16 illustrates a flow diagram of an example method to generate a vulnerability report while walking a call tree or graph, for example using a depth-first, breadth-first, or bit-scan traversal of the call-path representation, in accordance with example embodiments of the disclosure.

FIG. 16 illustrates a flow diagram 1600 of an example method to generate a vulnerability report while walking a call tree or graph, for example using a depth-first, breadth-first, or bit-scan traversal of the call-path representation, in accordance with example embodiments of the disclosure.

At block 1602, the system may construct or load a tree or graph representation of reachable functions. At block 1604, a traversal engine may perform a traversal (e.g., depth first, breadth first, or bit scan-driven) over the reachable functions to find the next reachable function. For bit scan modes, the reachable function dataset may be represented as a bit vector mapping function identifiers to bits, and scanning for set bits may identify candidate functions for processing.

At block 1606, when the traversal visits a reachable function node, the system may determine whether that function is associated with a vulnerability record in the database of vulnerable functions. If so, at block 1608, the system may add a corresponding entry to the report under construction, optionally annotating the entry with the path from the root entry function to the vulnerable function. The process may then return to 1604 and traverse to the next reachable function or end.

By generating the report while walking the tree or graph, the system may support streaming or incremental reports useful in interactive tools, while still being grounded in function level reachability.

Figure 17:
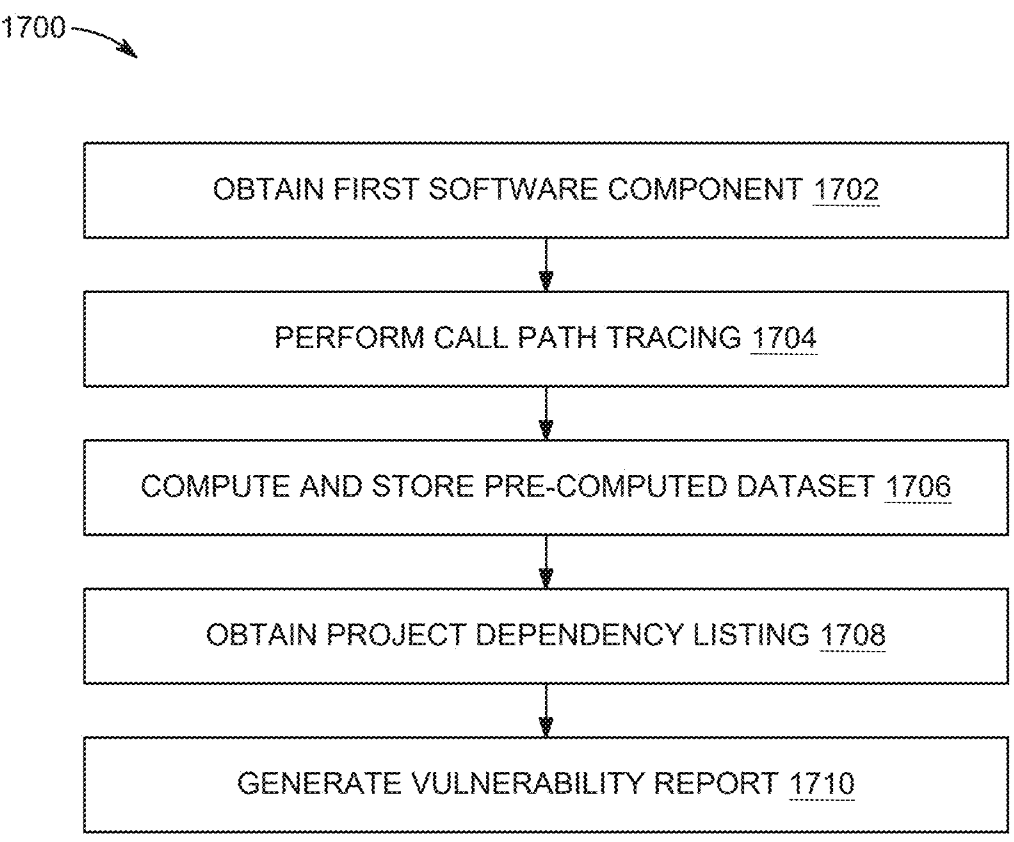
FIG. 17 illustrates a flow diagram of an example end-to-end method for pre-computing reachability information and generating a vulnerability report, and illustrates how the previously described components and flows may work together, in accordance with example embodiments of the disclosure.

FIG. 17 illustrates a flow diagram 1700 of an example end-to-end method for pre-computing reachability information and generating a vulnerability report, and illustrates how the previously described components and flows may work together, in accordance with example embodiments of the disclosure.

At block 1702, the analysis system may obtain a first software component for reachability analysis by retrieving a library and its artifacts via the library collection component 210, as described with respect to FIG. 11.

At block 1704, the analysis system may perform call path tracing from functions of the first software component to at least one function of a second software component by running the call path tracing flow 1200, as described with respect to FIG. 12, optionally invoking the private dependency handling flow 1300, as described with respect to FIG. 13, and/or the alternative flow 1400, as described with respect to FIG. 14. This call path tracing may yield the function level call graph 500.

At block 1706, the analysis system may compute, in association with the first software component, a pre-computed reachable dataset 234 comprising reachable functions of the first software component and may store the dataset 234 in the call path dataset storage 230 as part of table 710 in FIG. 7.

At block 1708, when a project analysis is requested, the analysis system may obtain a project dependency listing that identifies a plurality of software components including the first software component by receiving a manifest 902 via the developer interface component 270.

At block 1710, the analysis system may generate a vulnerability report for the software project based at least in part on the pre-computed reachable dataset 234 of the first software component, by executing the flows 1500 and 1600 (shown in FIG. 15 and FIG. 16, respectively) in conjunction with the database of vulnerable functions 246. The resulting report 1000 may identify functions among the reachable functions that are associated with vulnerabilities.

In some implementations, these operations may be triggered via the API(s) 124 of FIG. 1, allowing external tools to invoke the end to end analysis programmatically.

Figure 18:
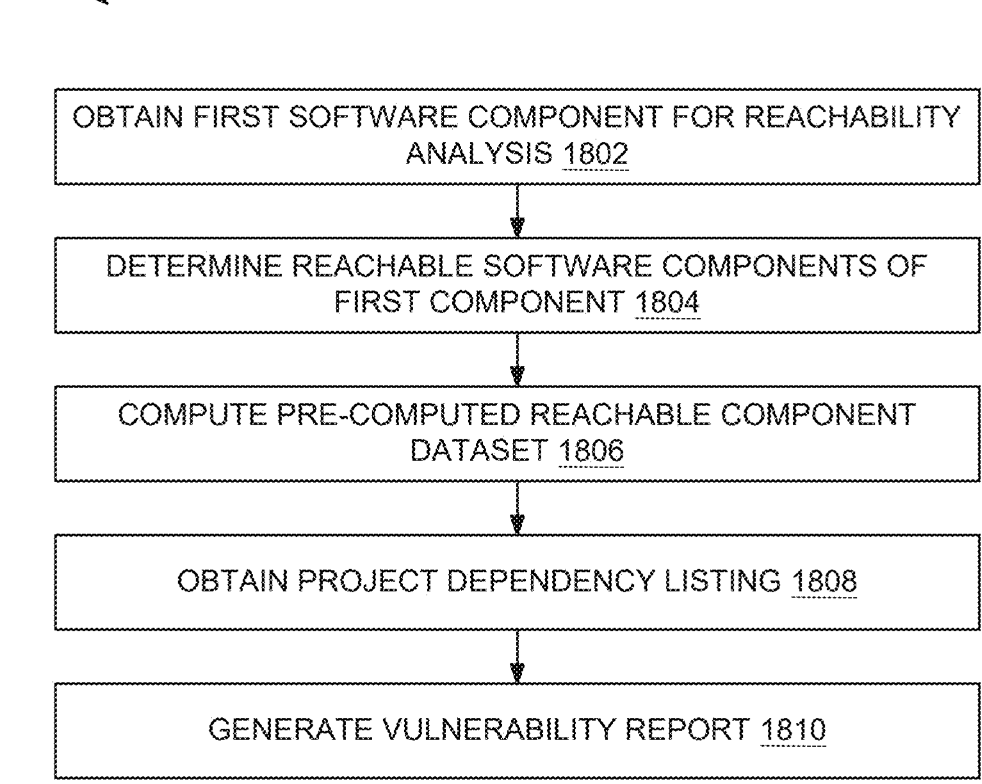
FIG. 18 illustrates a flow diagram 1800 of an example method for producing a project vulnerability report using component-level reachability, in accordance with example embodiments of the disclosure.

FIG. 18 illustrates a flow diagram 1800 of an example method for producing a project vulnerability report using component-level reachability, in accordance with example embodiments of the disclosure.

As illustrated, the example method of flow diagram 1800 may help exclude vulnerabilities in software components that are present in metadata but are not actually included (or used) for a particular project configuration. This component-level approach may be used by itself, or alongside function-level call-path tracing (e.g., to further refine reachability inside the remaining components).

At block 1802, the system may obtain a first software component for reachability analysis, such as a library identified by a name and (in some implementations) a version. For example, the first software component may be selected from a repository scan, from a customer-provided dependency listing, or from a curated set of commonly used libraries.

At block 1804, the system may determine reachable software components of the first software component. In some implementations, this may include determining that the reachable set includes the first software component itself, at least one direct dependency (a second software component), and at least one transitive dependency (a third software component) that is reachable by use of the first software component in a software project. Component reachability at this level may be derived from dependency metadata and configuration semantics rather than function-level call-path tracing. For example, the system may treat dependencies in a "test" or "debug" scope as not reachable for a runtime configuration, so components that are only pulled in for testing the library itself may be excluded from the reachable component set for production builds. As another example, the system may account for build parameters or options (e.g., a feature flag, optional plugin enablement, platform selectors, or "extras" semantics), where enabling or disabling an option changes which dependencies are included; in such cases, the system may determine different reachable component sets for different options (e.g., "feature enabled" includes an optional dependency, while "feature disabled" does not). In a project-specific scenario, the manifest may specify build settings (such as "production" vs. "development," platform/architecture, or configuration profiles), and those settings may be used to select which dependencies are treated as reachable for that project.

At block 1806, the system may compute, in association with the first software component, a pre-computed reachable component dataset that identifies the reachable software components determined at block 1804. In some implementations, the dataset may be stored per component/version and may also be stored per configuration option (e.g., separate datasets keyed by build profile or dependency scope), so that a later project analysis can select an applicable dataset based on the project's manifest parameters. In addition, while the method of FIG. 18 emphasizes component-level reachability, the pre-computed reachable component dataset may be derived in various ways, including being derived from function-level reachability information when available (e.g., by aggregating which components appear on reachable call paths), or being derived primarily from dependency/configuration rules when function-level information is unavailable or unnecessary for the filtering step.

At block 1808, the system may obtain a project dependency listing for a particular software project, including the first software component. The listing may include versions and, in some implementations, build parameters, scopes, environments, or configuration selectors (e.g., "prod," "dev," "test," platform), which may be used to select among multiple reachable component datasets computed for different configurations.

At block 1810, the system may generate a vulnerability report based at least in part on the pre-computed reachable component dataset. For example, the system may correlate vulnerabilities to the reachable software components identified in the dataset and exclude vulnerabilities tied to software components that are not in the reachable component set for the applicable configuration. This can reduce noise compared to approaches that include vulnerabilities from every component appearing anywhere in a transitive dependency graph, including components that would not even be included in the project's configured build. In some implementations, once the component-level filtering is applied, the system may optionally perform function-level reachability analysis within the remaining components (or use previously stored function-level datasets) to further distinguish reachable versus unreachable vulnerable functions inside those components.

Figure 19:
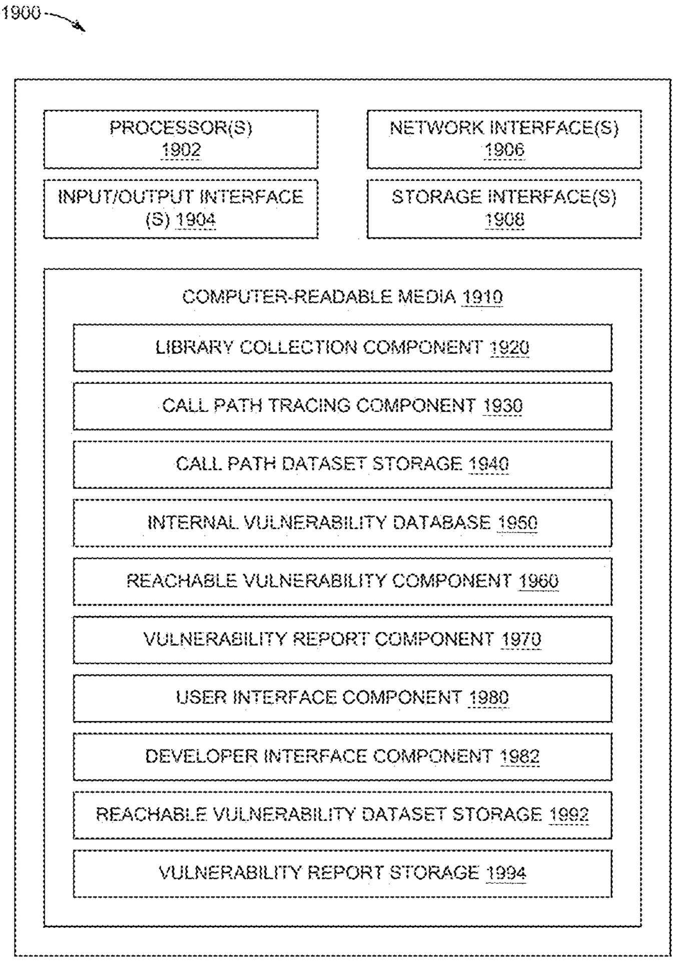
FIG. 19 illustrates a block diagram of an example computer system suitable for implementing components of the reachability analysis system and performing the disclosed methods, in accordance with example embodiments of the disclosure.

FIG. 19 illustrates a block diagram of an example computer system suitable for implementing components of the reachability analysis system and performing the disclosed methods, in accordance with example embodiments of the disclosure. Example computer system 1900 may be suitable for implementing one or more components of reachability analysis system 120 and/or core reachability analysis system 200. The computer system 1900 may include one or more processor(s) 1902, one or more input/output (I/O) interface(s) 1904, one or more network interface(s) 1906, one or more storage interface(s) 1908, and computer-readable media 1910.

In some implementations, the processor(s) 1902 may include a central processing unit (CPU), a graphics processing unit (GPU), both CPU and GPU, a microprocessor, a digital signal processor, and/or other processing units or components. Alternatively, or in addition, the functionality described herein may be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip system(s) (SOCs), complex programmable logic devices (CPLDs), and the like. Additionally, each of the processor(s) 1902 may possess its own local memory, which also may store program modules, program data, and/or one or more operating system(s). The one or more processor(s) 1902 may include one or more cores.

The one or more I/O interface(s) 1904 may enable the computer system 1900 to detect interaction with a user and/or with other device(s). The I/O interface(s) 1904 may include a combination of hardware, software, and/or firmware, and may include software drivers for enabling operation of any variety of I/O device(s) integrated with, coupled to, or otherwise associated with the computer system 1900, such as displays, keyboards, pointing devices, microphones, speakers, cameras, switches, sensors, and the like.

The one or more network interface(s) 1906 may enable the computer system 1900 to communicate over one or more networks using any variety of protocol-based communications. The network interface(s) 1906 may include a combination of hardware, software, and/or firmware, and may include software drivers for enabling any variety of wireline and/or wireless communications. For example, the network interface(s) 1906 may include one or more of an Ethernet interface, a wireless interface, a cellular radio, a Bluetooth® interface, and the like. In some implementations, the network interface(s) 1906 may include radio-frequency circuitry that allows the computer system 1900 to communicate over different standards and/or to transition between different standards.

The one or more storage interface(s) 1908 may enable the processor(s) 1902 to interface with and exchange data with computer-readable media 1910 and, in some implementations, with one or more storage device(s) external to the computer system 1900.

The computer-readable media 1910 may include volatile and/or nonvolatile memory, removable and non-removable media implemented in any method or technology for storage of information, such as computer-readable instructions, data structures, program modules, or other data. Such memory may include random access memory (RAM), read-only memory (ROM), electrically erasable programmable read-only memory (EEPROM), flash memory or other memory technology, optical storage, magnetic storage, RAID storage system(s), and/or any other medium which can be used to store the desired information and which can be accessed by a computing device. The computer-readable media 1910 may be implemented as computer-readable storage media (CRSM), which may be any available physical media accessible by the processor(s) 1902 to execute instructions stored on the computer-readable media 1910. The computer-readable media 1910 may have an operating system (OS) and/or one or more applications stored thereon, where the OS, when executed by the processor(s) 1902, may enable management of hardware and/or software resources of the computer system 1900.

In some implementations, one or more functional blocks may be stored within the computer-readable media 1910 and configured to execute on the processor(s) 1902. For example, the computer-readable media 1910 may store instructions that, when executed by the processor(s) 1902, implement one or more of a library collection component 1920, a call path tracing component 1930, call path dataset storage 1940, an internal vulnerability database 1950, a reachable vulnerability component 1960, a vulnerability report component 1970, a user interface component 1980, a developer interface component 1982, reachable vulnerability dataset storage 1992, and vulnerability report storage 1994. It will be appreciated that instructions stored in these components, when executed by the processor(s) 1902, may configure the computer system 1900 to perform operations described herein, including obtaining software components for component-level reachability analysis, determining reachable software components of a first software component based at least in part on call-path tracing that identifies at least one call path from the first software component into at least one second software component, computing and storing, in association with the first software component, a pre-computed reachable component dataset identifying software components reachable from the first software component, receiving a project dependency listing identifying software components used by a software project, and generating a vulnerability report based at least in part on the pre-computed reachable component dataset to identify vulnerabilities associated with reachable software components, as described throughout this disclosure.

In distributed deployments, multiple systems like computer system 1900 may cooperate to form the reachability analysis system 120 of FIG. 1, with different services executing on different nodes and communicating over a network.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other implementations, the databases shown can be integrated or distributed into any number of databases or other data storage devices.

Many modifications and other implementations of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:

obtaining a first software component for reachability analysis;

determining, for the first software component, a first plurality of software components that are reachable by use of the first software component in a software project as reachable software components of the first software component, the reachable software components including the first software component, a second software component that is a dependency of the first software component, and a third software component that is a dependent software component of the second software component that is reachable by the second software component by the use of the first software component in the software project;

computing, in association with the first software component, a pre-computed reachable component dataset comprising the reachable software components of the first software component;

obtaining a project dependency listing that identifies a second plurality of software components used by a particular software project, the second plurality of software components including the first software component; and generating a vulnerability report for the particular software project based at least in part on the pre-computed reachable component dataset, the vulnerability report identifying vulnerabilities of the reachable software components of the first software component.

2. The computer-implemented method of claim 1, wherein the vulnerability report excludes vulnerabilities associated with another dependent software component of the second software component that is not reachable by the second software component by the use of the first software component in the software project.

3. The computer-implemented method of claim 1, wherein determining the first plurality of software components that are reachable comprises performing function-level call-path tracing originating in the first software component to identify one or more reachable functions, and wherein computing the pre-computed reachable component dataset comprises storing, for at least one reachable software component, identifiers of one or more of the reachable functions that are included in the at least one reachable software component.

4. The computer-implemented method of claim 3, wherein the vulnerability report excludes vulnerabilities that exist in the third software component and that are not reachable via any function-level call path originating in the first software component.

5. The computer-implemented method of claim 1, further comprising exposing an application programming interface (API) that accepts the project dependency listing and returns the vulnerability report.

6. The computer-implemented method of claim 1, wherein the determining and the computing are performed separately for a plurality of different versions of the first software component to compute, for the plurality of different versions, distinct pre-computed reachable component datasets.

7. The computer-implemented method of claim 1, wherein generating the vulnerability report further comprises retrieving, from a vulnerability database, vulnerability details for at least some of the reachable software components and including at least some of the vulnerability details in the vulnerability report.

8. One or more non-transitory computer-readable media storing instructions that, when executed by one or more processors, cause the one or more processors to perform operations comprising:

obtaining a first software component for reachability analysis;

determining, for the first software component, a first plurality of software components that are reachable by use of the first software component in a software project as reachable software components of the first software component, the reachable software components including the first software component, a second software component that is a dependency of the first software component, and a third software component that is a dependent software component of the second software component that is reachable by the second software component by the use of the first software component in the software project;

computing, in association with the first software component, a pre-computed reachable component dataset comprising the reachable software components of the first software component;

obtaining a project dependency listing that identifies a second plurality of software components used by a particular software project, the second plurality of software components including the first software component; and generating a vulnerability report for the particular software project based at least in part on the pre-computed reachable component dataset, the vulnerability report identifying vulnerabilities of the reachable software components of the first software component.

9. The one or more non-transitory computer-readable media of claim 8, wherein the vulnerability report excludes vulnerabilities associated with another dependent software component of the second software component that is not reachable by the second software component by the use of the first software component in the software project.

10. The one or more non-transitory computer-readable media of claim 8, wherein determining the first plurality of software components that are reachable comprises performing function-level call-path tracing originating in the first software component to identify one or more reachable functions, and wherein computing the pre-computed reachable component dataset comprises storing, for at least one reachable software component, identifiers of one or more of the reachable functions that are included in the at least one reachable software component.

11. The one or more non-transitory computer-readable media of claim 10, wherein the vulnerability report excludes vulnerabilities that exist in the third software component and that are not reachable via any function-level call path originating in the first software component.

12. The one or more non-transitory computer-readable media of claim 8, wherein the operations further comprise exposing an application programming interface (API) that accepts the project dependency listing and returns the vulnerability report.

13. The one or more non-transitory computer-readable media of claim 8, wherein the determining and the computing are performed separately for a plurality of different versions of the first software component to compute, for the plurality of different versions, distinct pre-computed reachable component datasets.

14. The one or more non-transitory computer-readable media of claim 8, wherein generating the vulnerability report further comprises retrieving, from a vulnerability database, vulnerability details for at least some of the reachable software components and including at least some of the vulnerability details in the vulnerability report.

15. A system comprising:

one or more processors; and one or more non-transitory computer-readable media storing instructions that, when executed by the one or more processors, cause the system to:

obtain a first software component for reachability analysis;

determine, for the first software component, a first plurality of software components that are reachable by use of the first software component in a software project as reachable software components of the first software component, the reachable software components including the first software component, a second software component that is a dependency of the first software component, and a third software component that is a dependent software component of the second software component that is reachable by the second software component by the use of the first software component in the software project;

compute, in association with the first software component, a pre-computed reachable component dataset comprising the reachable software components of the first software component;

obtain a project dependency listing that identifies a second plurality of software components used by a particular software project, the second plurality of software components including the first software component; and generate a vulnerability report for the particular software project based at least in part on the pre-computed reachable component dataset, the vulnerability report identifying vulnerabilities of the reachable software components of the first software component.

16. The system of claim 15, wherein the vulnerability report excludes vulnerabilities associated with another dependent software component of the second software component that is not reachable by the second software component by the use of the first software component in the software project.

17. The system of claim 15, wherein determining the first plurality of software components that are reachable comprises performing function-level call-path tracing originating in the first software component to identify one or more reachable functions, and wherein computing the pre-computed reachable component dataset comprises storing, for at least one reachable software component, identifiers of one or more of the reachable functions that are included in the at least one reachable software component.

18. The system of claim 17, wherein the vulnerability report excludes vulnerabilities that exist in the third software component and that are not reachable via any function-level call path originating in the first software component.

19. The system of claim 15, further comprising an application programming interface (API), wherein the system is configured to receive, via the API, the project dependency listing and to return, via the API, the vulnerability report.

20. The system of claim 15, wherein the system is configured to perform the determining and the computing separately for a plurality of different versions of the first software component to compute, for the plurality of different versions, distinct pre-computed reachable component datasets.

* * * * *